US012781850B2

(12) United States Patent
Sugawara

(10) Patent No.: US 12,781,850 B2
(45) Date of Patent: Nov. 3, 2026

(54) WORM REDUCTION GEAR AND ASSEMBLING METHOD THEREOF

(71) Applicant: NSK STEERING & CONTROL, INC., Tokyo (JP)

(72) Inventor: Hiroyuki Sugawara, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 19/143,535

(22) PCT Filed: Dec. 26, 2023

(86) PCT No.: PCT/JP2023/046685

§ 371 (c)(1),
(2) Date: Jun. 26, 2025

(87) PCT Pub. No.: WO2024/143373

PCT Pub. Date: Jul. 4, 2024

(65) Prior Publication Data

US 2026/0218791 A1 Jul. 30, 2026

(30) Foreign Application Priority Data

Dec. 27, 2022 (JP) ................................ 2022-209401

(51) Int. Cl.
*F16H 57/023* (2012.01)
*F16H 1/16* (2006.01)
(Continued)

(52) U.S. Cl.
CPC ............... *F16H 57/12* (2013.01); *F16H 1/16* (2013.01); *F16H 57/021* (2013.01);
(Continued)

(58) Field of Classification Search
CPC ........ F16H 1/16; F16H 57/039; F16H 57/023; F16H 57/021; F16H 57/12
See application file for complete search history.

(56) References Cited

U.S. PATENT DOCUMENTS 7,360,467 B2 * 4/2008 Segawa ............... H02K 7/1166
180/444
2006/0117889 A1 6/2006 Segawa et al.
(Continued)

FOREIGN PATENT DOCUMENTS

JP 2005-42913 A 2/2005
JP 2009-107361 A 5/2009
(Continued)

OTHER PUBLICATIONS

International Search Report (PCT/ISA/210) and Written Opinion (PCT/ISA/237) issued on Feb. 6, 2024 by the International Searching Authority in International Patent Application No. PCT/JP2023/046685.

*Primary Examiner* — Gregory Robert Weber
(74) *Attorney, Agent, or Firm* — Sughrue Mion, PLLC

(57) ABSTRACT

A pad (20) includes a pad base portion (55) disposed between two guide portions (49) of a holder (19), two pad engagement portions (53) provided on side surfaces on both sides of the pad base portion (55) in a third direction and in contact with two holder engagement portions (41), a pad recessed portion (76) provided on a side surface on the other side of the pad base portion (55) in a second direction over a first direction, and a pad elastic pressing portion (77) elastically pressing a part of the holder (19) toward the other side in the second direction to apply a preload to contact portions between the holder engagement portions (41) and the pad engagement portions (53).

9 Claims, 25 Drawing Sheets

(51) Int. Cl.

| | |
|---|---|
| ***F16H 57/021*** | (2012.01) |
| ***F16H 57/039*** | (2012.01) |
| ***F16H 57/12*** | (2006.01) |
| *B62D 5/04* | (2006.01) |
| *F16H 57/02* | (2012.01) |

(52) U.S. Cl.

CPC ......... *F16H 57/023* (2013.01); *F16H 57/039* (2013.01); *B62D 5/0454* (2013.01); *F16H 2057/02034* (2013.01); *F16H 2057/02082* (2013.01); *F16H 2057/0213* (2013.01); *F16H 2057/127* (2013.01)

(56) References Cited

U.S. PATENT DOCUMENTS

| | | | |
|---|---|---|---|
| 2007/0251757 | A1 | 11/2007 | Segawa et al. |
| 2007/0251758 | A1 | 11/2007 | Segawa et al. |
| 2022/0099159 | A1 | 3/2022 | Oosawa et al. |
| 2024/0175489 | A1 | 5/2024 | Sugawara |

FOREIGN PATENT DOCUMENTS

| | | | |
|---|---|---|---|
| JP | 4381024 | B2 | 12/2009 |
| JP | 2021-17930 | A | 2/2021 |
| JP | 2023-4553 | A | 1/2023 |
| WO | 2023/276598 | A1 | 1/2023 |

* cited by examiner

WORM REDUCTION GEAR AND ASSEMBLING METHOD THEREOF

CROSS-REFERENCE TO RELATED APPLICATIONS

This application is a National Phase Entry of PCT International Application No. PCT/JP2023/046685 filed on Dec. 26, 2023, which claims priority to Japanese Patent Application No. 2022-209401 filed on Dec. 27, 2022, the contents of all of which are incorporated herein by reference in their respective entireties.

TECHNICAL FIELD

The present disclosure relates to a worm reducer incorporated in, for example, an electric power steering device and a method for assembling the same.

BACKGROUND ART

An electric power steering device using an electric motor as an auxiliary power source is widely used as a device for reducing a force required to operate a steering wheel when a steering angle is applied to steered wheels of an automobile.

The structure of the electric power steering device is roughly classified according to a mounting position of the electric motor. Specifically, various structures have been proposed, such as a column assist type in which auxiliary power is applied to a steering shaft rotatably supported inside a steering column, a pinion assist type in which auxiliary power is applied to a pinion shaft that is an input shaft of a steering gear unit, and a dual pinion type in which a pinion shaft different from a pinion shaft that is an input shaft is provided in a steering gear unit and auxiliary power is applied to the pinion shaft.

In any of the structures, the auxiliary power of the electric motor is applied to a shaft member that rotates or linearly moves by the operation of the steering wheel via a reducer. A worm reducer is widely used as the reducer. The worm reducer constituting the electric power steering device includes a worm rotationally driven by an electric motor and a worm wheel meshing with the worm.

FIG. 25 shows an example of a structure of the worm reducer in the related art described in Japanese U.S. Pat. No. 4,381,024. A worm reducer 100 includes a housing 101, a worm wheel 102, and a worm 103.

The housing 101 includes a wheel accommodating portion 104 and a worm accommodating portion 105 whose central axis is at a skew position with respect to a central axis of the wheel accommodating portion 104 and whose axially intermediate portion opens into the wheel accommodating portion 104.

The worm wheel 102 has wheel teeth 106 on an outer circumferential surface thereof, and is supported and fixed coaxially with a rotation shaft 107 around the rotation shaft 107 rotatably supported inside the wheel accommodating portion 104.

The worm 103 has worm teeth 108 that mesh with the wheel teeth 106 on an outer circumferential surface of an axially intermediate portion. The worm 103 is rotatably supported inside the worm accommodating portion 105 by two ball bearings 109*a* and 109*b* at two positions in the axial direction sandwiching the worm teeth 108. Of the two ball bearings 109*a* and 109*b*, an outer ring of the ball bearing 109*a* on a tip end side (right side of FIG. 25) of the worm 103 is press-fitted into a holder 110 internally fitted and fixed inside a back end side portion of the worm accommodating portion 105. An inner ring of the ball bearing 109*a* is externally fitted to a large-diameter portion 111 provided in a portion of the worm 103 located closer to the tip end side than the worm teeth 108 with a gap therebetween via a bush 112 made of a synthetic resin. That is, the inner ring of the ball bearing 109*a* is externally fitted to the bush 112 externally fitted to the large-diameter portion 111 of the worm 103 with the gap therebetween without rattling. An outer ring of the ball bearing 109*b* on a base end side (left side of FIG. 25) of the worm 103 is internally fitted to an opening of the worm accommodating portion 105 with a gap therebetween, and the inner ring of the ball bearing 109*b* is externally fitted to a base end portion of the worm 103. An output shaft of an electric motor 113 is connected to the base end portion of the worm 103 so as to be able to transmit torque. That is, the worm 103 can be rotationally driven by the electric motor 113.

In the worm reducer 100, unavoidable backlash is present at a meshing portion between the wheel teeth 106 and the worm teeth 108 due to dimensional errors and assembly errors of components constituting the worm reducer 100. Due to the presence of the backlash, an unpleasant tooth rattling noise may occur at the meshing portion when changing a rotation direction of the steering wheel. In the illustrated example, in order to suppress the occurrence of the tooth rattling noise, a tip end portion of the worm 103 is elastically biased toward a worm wheel 102 side.

That is, the base end portion of the worm 103 is supported by the ball bearing 109*b* having a radial gap relative to the worm accommodating portion 105 so as to be slightly swingable and displaceable. An annular gap is present over the entire circumference between an outer circumferential surface of the large-diameter portion 111 of the worm 103 and an inner circumferential surface of the bush 112. A pad 114 is externally fitted to the tip end portion of the worm 103, and a torsion coil spring 115 is installed between the pad 114 and the holder 110. The pad 114 is elastically pressed by the torsion coil spring 115 toward the worm wheel 102 side in a first direction (upper-lower direction in FIG. 25), which is a direction in which the worm 103 moves toward and away from the worm wheel 102 side, so that the tip end portion of the worm 103 is elastically biased toward the worm wheel 102 side (upper side of FIG. 25) in the first direction. Accordingly, the backlash between the wheel teeth 106 and the worm teeth 108 is suppressed, and the occurrence of the tooth rattling noise is suppressed.

CITATION LIST

Patent Literature

Patent Literature 1: JP4381024B

SUMMARY OF INVENTION

Technical Problem

In the structure described in Japanese U.S. Pat. No. 4,381,024, the annular gap is present over the entire circumference between the outer circumferential surface of the large-diameter portion 111 of the worm 103 and the inner circumferential surface of the bush 112, so that the tip end portion of the worm 103 can be pressed in a direction approaching the worm wheel 102. Further, although an annular gap is smaller than the annular gap present between the outer circumferential surface of the large-diameter portion 111 of the worm 103 and the inner circumferential surface of the bush 112, the annular gap is also present over the entire circumference between the tip end portion of the worm 103 and a through hole of the pad 114. Therefore, when the rotation direction of the steering wheel is changed, that is, when the rotation direction of the worm 103 is changed, of a reaction force applied from the wheel teeth 106 to the worm teeth 108, a direction of a component in a third direction (front-back direction in FIG. 25) orthogonal to both the first direction and a second direction (left-right direction in FIG. 25), which is an axial direction of the worm accommodating portion 105, may change, and the tip end portion of the worm 103 may be displaced vigorously in the third direction. Therefore, there is room for improvement in terms of suppressing the occurrence of abnormal noise such as the tooth rattling noise.

An object of the present disclosure is to provide a worm reducer capable of making a tip end portion of a worm less likely to be displaced in a third direction orthogonal to both a first direction, which is a biasing direction of the tip end portion, and a second direction, which is an axial direction of a worm accommodating portion, when a rotation direction of the worm is changed, and capable of improving workability of assembly work.

Solution to Problem

A worm reducer of an aspect of the present disclosure includes a housing, a worm wheel, a worm, a holder, a pad, and an elastic member.

The housing includes a wheel accommodating portion and a worm accommodating portion that is disposed at a skew position with respect to the wheel accommodating portion and whose axially intermediate portion opens to the wheel accommodating portion.

The worm wheel has wheel teeth on an outer circumferential surface thereof and is rotatably supported inside the wheel accommodating portion.

The worm has worm teeth that mesh with the wheel teeth on an outer circumferential surface thereof and is rotatably supported inside the worm accommodating portion.

The holder is disposed between a tip end portion of the worm and the worm accommodating portion.

The pad is externally fitted to the tip end portion of the worm.

The elastic member is assembled to the holder and elastically biases the tip end portion of the worm toward a worm wheel side via the pad.

The holder includes a held portion that is internally fitted and held inside the worm accommodating portion in a state in which rotation is prevented, two guide portions that protrude toward one side in a second direction, which is an axial direction of the worm accommodating portion, from two positions spaced apart in a third direction orthogonal to both a first direction, which is a biasing direction by the elastic member, and the second direction, of a side surface on one side of the held portion in the second direction, and two holder engagement portions provided on inner side surfaces of the two guide portions facing each other.

The pad includes a pad base portion that is disposed between the two guide portions, two pad engagement portions that are provided on side surfaces on both sides of the pad base portion in the third direction and are in contact with the two holder engagement portions, a pad recessed portion formed on a side surface on the other side of the pad base portion in the second direction to extend in the first direction, and a pad elastic pressing portion that elastically presses a part of the holder toward the other side in the second direction to apply a preload to a contact portion between the holder engagement portion and the pad engagement portion.

In the worm reducer of the aspect of the present disclosure, the two holder engagement portions are implemented by two holder inclined surfaces inclined in directions approaching each other as the two holder engagement portions approach one side in the second direction, and the two pad engagement portions may be implemented by two pad inclined surfaces in surface contact with the two holder inclined surfaces.

In the worm reducer of the aspect of the present disclosure, the holder may include a connection portion that connects an end portion of the two guide portions on a side close to the worm wheel in the first direction.

In the worm reducer of the aspect of the present disclosure, the pad elastic pressing portion may include two pad elastic pressing plates located on one side in the second direction with respect to the two pad engagement portions and each extending from a central portion of the pad in the third direction toward a side away from each other in the third direction, and a part of the holder that is elastically pressed toward the other side in the second direction by the two pad elastic pressing plates may be implemented by a holder pressed surface provided on an end surface on the one side in the second direction of each of the two guide portions.

In this case, each of the two pad elastic pressing plates may have a slit penetrating in the second direction and extending in the first direction at an end portion on a central side of the pad in the third direction.

A method for assembling the worm reducer of the aspect of the present disclosure is a method for assembling the worm reducer of the aspect of the present disclosure, the method including steps of: disposing the holder with respect to a guide jig having a guide convex portion extending in a predetermined direction such that the first direction coincides with an extending direction of the guide convex portion and a center position between the two guide portions in the third direction coincides with a center position of the guide convex portion in a width direction; and disposing the pad base portion between the two guide portions by moving the pad along the guide convex portion in a state in which the guide convex portion is inserted inside the pad recessed portion.

In the method for assembling the worm reducer of the aspect of the present disclosure, the guide jig may be configured such that a width dimension of the guide convex portion increases toward a front side in a moving direction of the pad.

In the method of assembling the worm reducer of the aspect of the present disclosure, in the step, the guide jig and the holder may be positioned in the third direction by engaging a jig-side positioning engagement portion provided in the guide jig with a holder-side positioning engagement portion provided in the holder. That is, by engaging the jig-side positioning engagement portion with the holder-side positioning engagement portion, the guide jig may be disposed in a state in which the extending direction of the guide convex portion coincides with the first direction and the center position of the guide convex portion in the width direction coincides with the center position between the two guide portions in the second direction.

Advantageous Effects of Invention

According to the worm reducer of the aspect of the present disclosure, when the rotation direction of the worm is changed, the tip end portion of the worm can be made less likely to be displaced in the third direction orthogonal to both the first direction, which is the biasing direction of the tip end portion, and the second direction, which is the axial direction of the worm accommodating portion, and the workability of the assembly work can be improved.

BRIEF DESCRIPTION OF DRAWINGS

FIG. 21A is a view viewed from one side in a third direction, FIG. 21B is a view viewed from a second direction, FIG. 21C is a view viewed from the other side in the third direction, and FIG. 21D is a view viewed from a first direction.

FIG. 22A is a perspective view, FIG. 22B is a view viewed from the first direction, and FIG. 22C is a view viewed from one side in the third direction.

DESCRIPTION OF EMBODIMENTS

First Example

A first example of an embodiment of the present disclosure will be described with reference to FIGS. 1 to 18C. In this example, a case where a worm reducer of an aspect of the present disclosure is applied to a pinion assist type electric power steering device will be described. However, any worm reducer of the aspect of the present disclosure can be widely applied to a column assist type or dual pinion type electric power steering device, and a worm reducer incorporated in various mechanical devices other than the electric power steering device.

Figure 1:
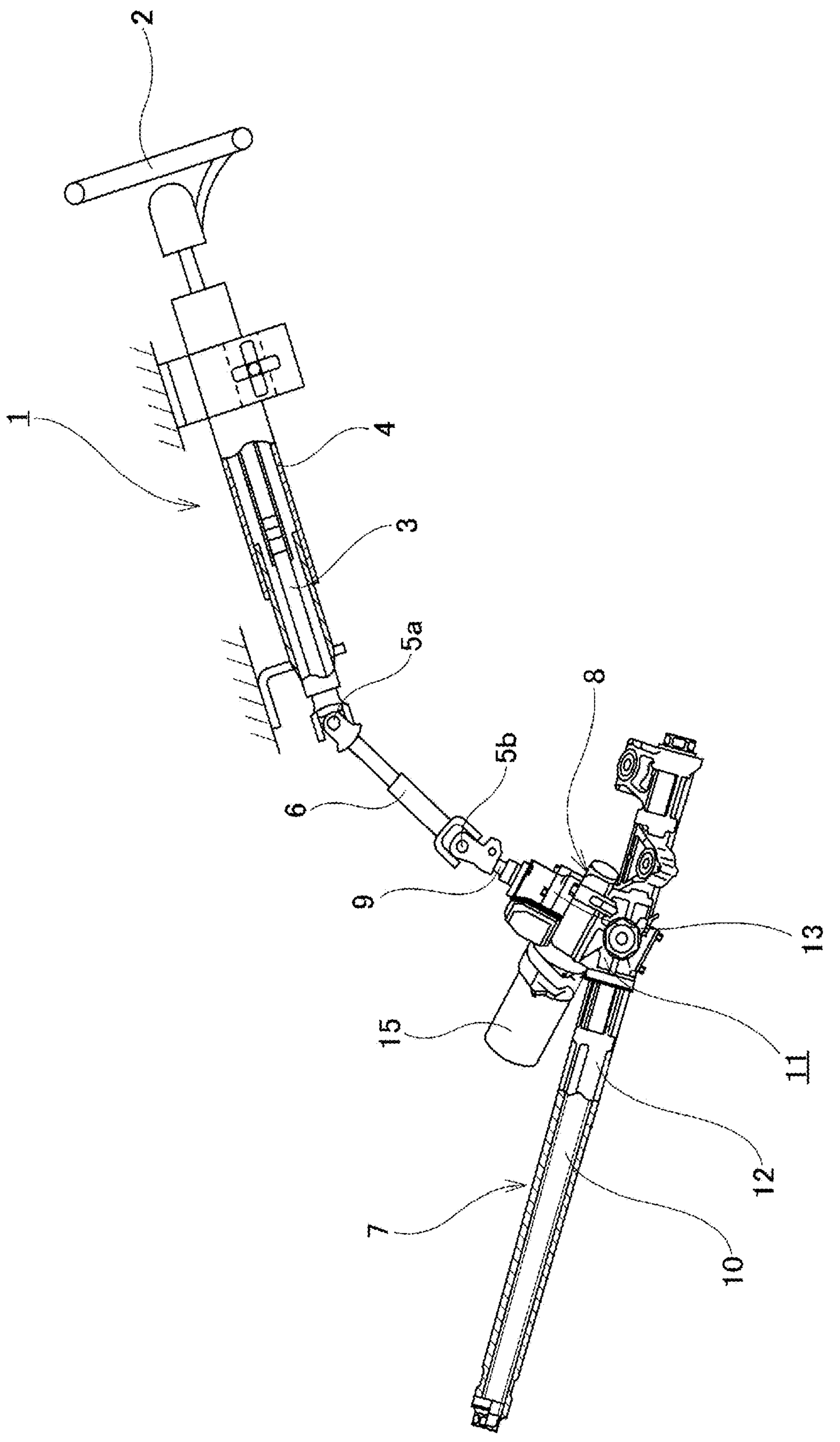
FIG. 1 is a diagram showing an electric power steering device incorporating a worm reducer according to a first example of an embodiment of the present disclosure.
Figure 2:
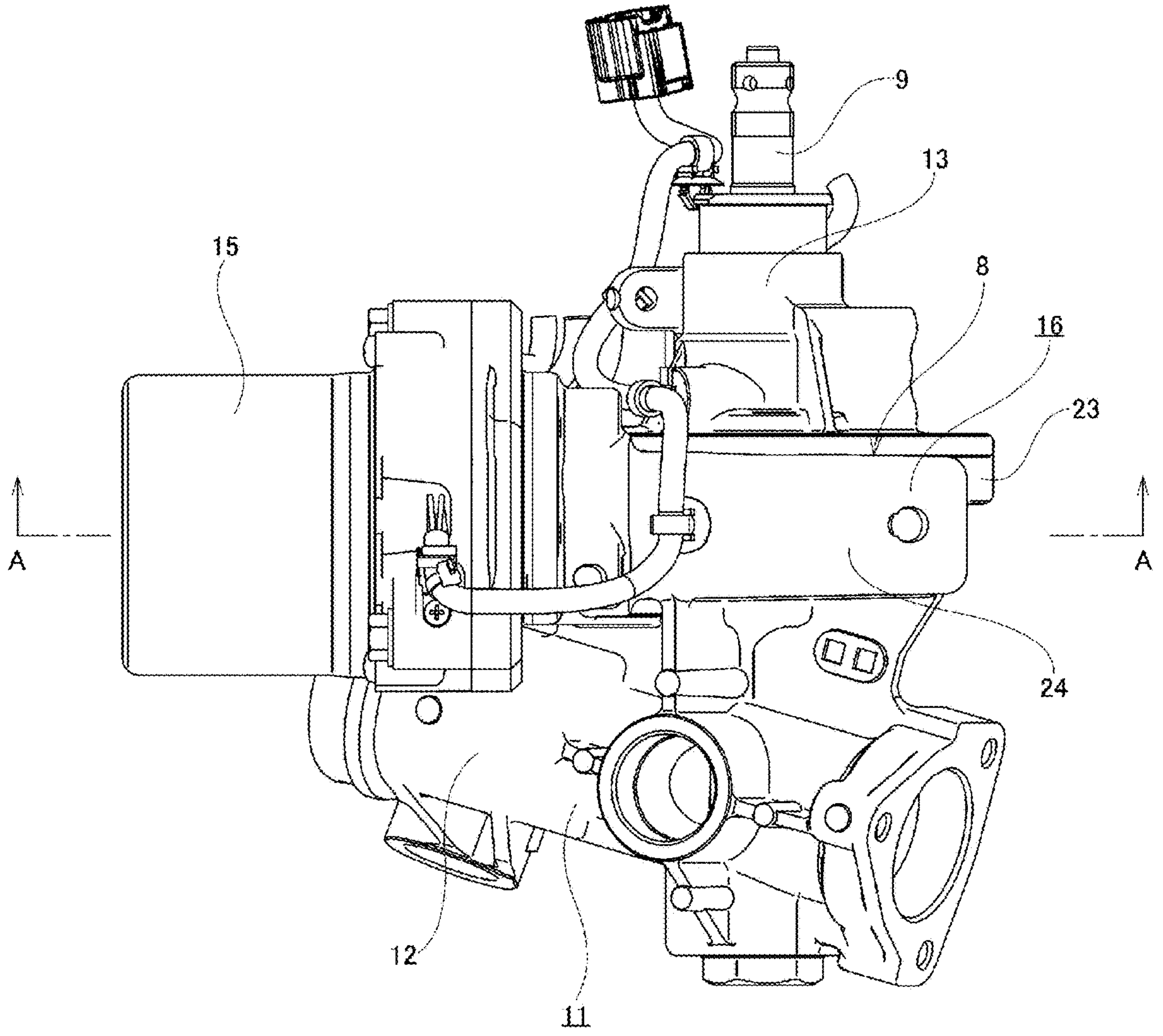
FIG. 2 is a diagram showing a part of the electric power steering device incorporating the worm reducer according to the first example of the embodiment of the present disclosure.
Figure 3:
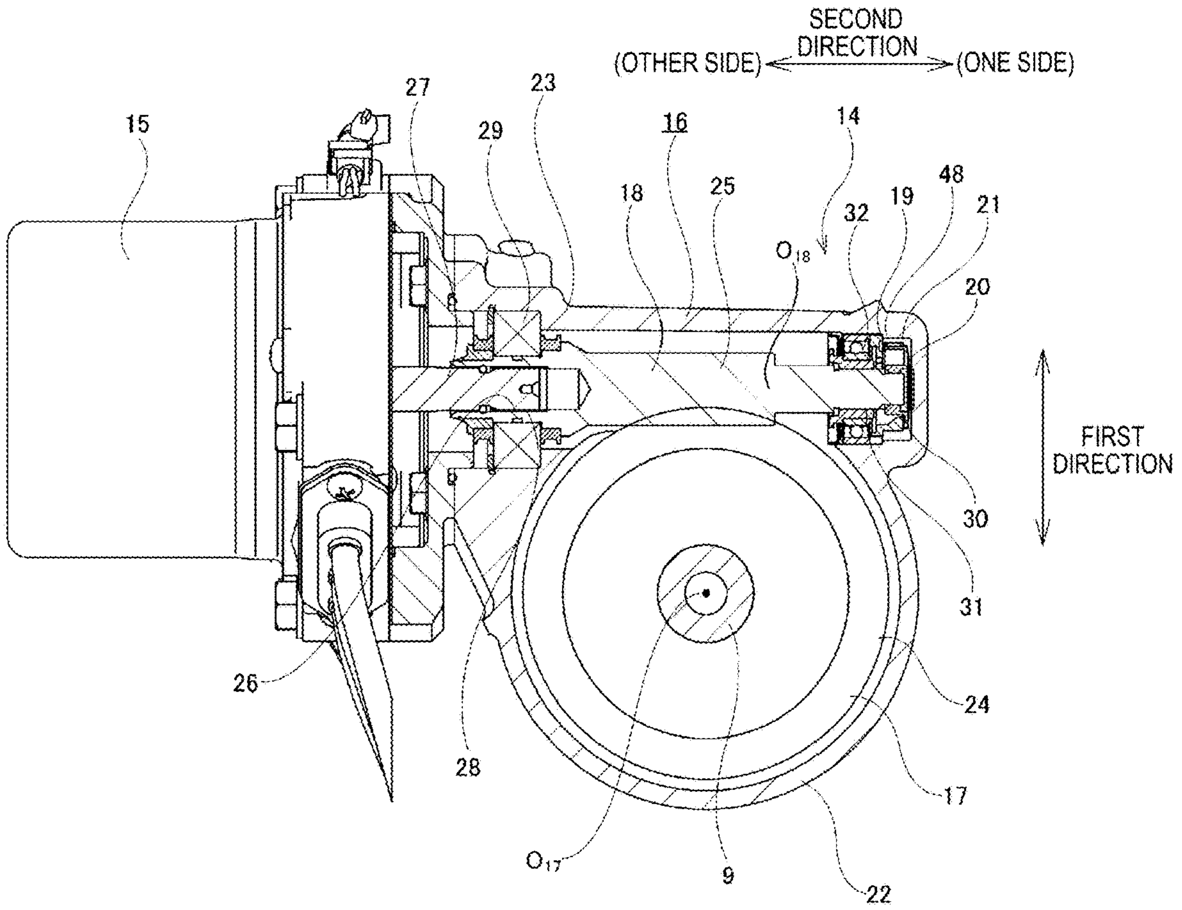
FIG. 3 is a cross-sectional view taken along a line A-A of FIG. 2.
Figure 4:
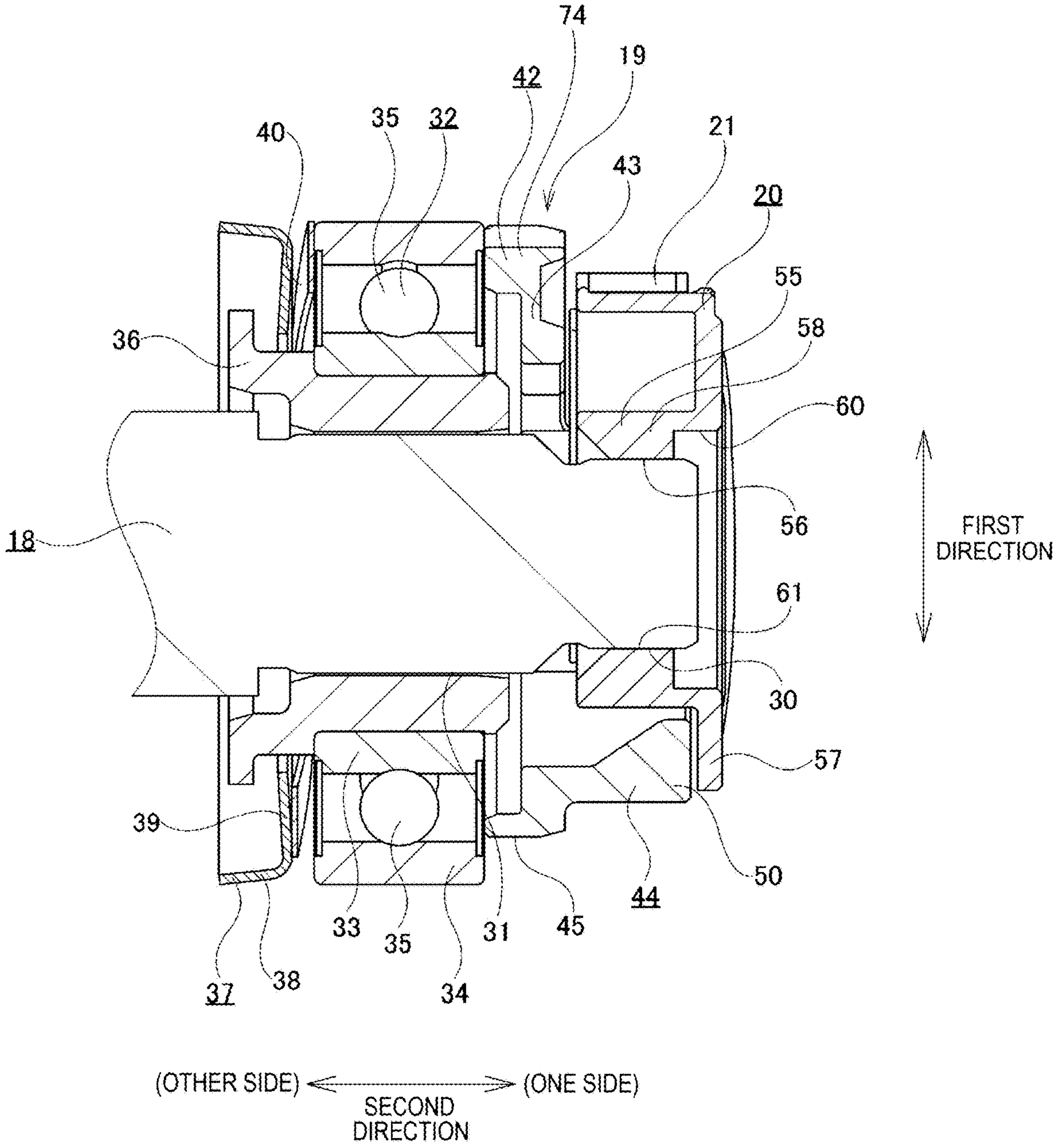
FIG. 4 is an enlarged view of an upper right portion of FIG. 3 with a housing omitted.
Figure 5:
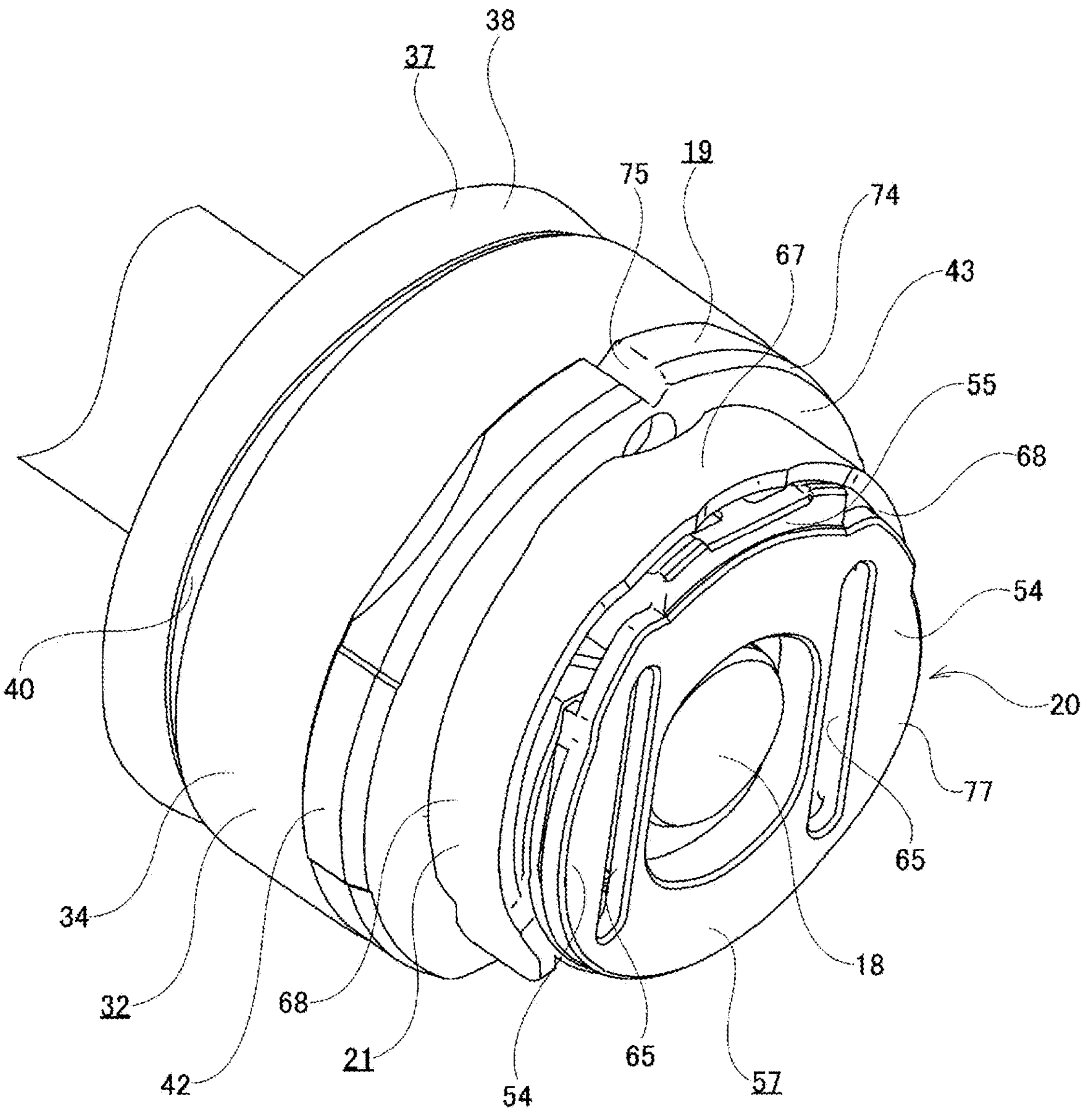
FIG. 5 is a perspective view showing a tip end portion of a worm and members disposed around the tip end portion.

FIG. 1 shows a pinion assist type electric power steering device 1 incorporating a worm reducer 14 of this example. The electric power steering device 1 includes a steering wheel 2, a steering shaft 3, a steering column 4, a pair of universal joints 5*a* and 5*b*, an intermediate shaft 6, a steering gear unit 7, and an electric assist device 8.

The steering wheel 2 is supported and fixed to a rear end portion of the steering shaft 3. The steering shaft 3 is rotatably supported inside the steering column 4 supported by a vehicle body. A front end portion of the steering shaft 3 is connected to a pinion shaft 9 of the steering gear unit 7 via the rear universal joint 5*a*, the intermediate shaft 6, and the front universal joint 5*b*. Therefore, when a driver rotates the steering wheel 2, the rotation of the steering wheel 2 is transmitted to the pinion shaft 9 via the steering shaft 3, the pair of universal joints 5*a* and 5*b*, and the intermediate shaft 6. The rotation of the pinion shaft 9 is converted into straight line motion of a rack shaft 10 of the steering gear unit 7 meshing with the pinion shaft 9. As a result, a steering angle corresponding to a rotation operation amount of the steering wheel 2 is applied to a pair of steered wheels. The electric assist device 8 applies auxiliary power generated by the electric motor 15 as a power source to the pinion shaft 9. As a result, force required by the driver to rotate the steering wheel 2 is reduced.

The steering gear unit 7 includes a housing 11 supported and fixed to the vehicle body, the rack shaft 10, and the pinion shaft 9. The housing 11 includes a rack accommodating portion 12 extending in a vehicle width direction and a pinion accommodating portion 13 connected to one side portion of the rack accommodating portion 12 in an axial direction (right side portion in FIG. 1). A central axis of the pinion accommodating portion 13 is present at a skew position with respect to a central axis of the rack accommodating portion 12. An internal space of the pinion accommodating portion 13 communicates with an internal space of the rack accommodating portion 12. The rack shaft 10 is supported inside the rack accommodating portion 12 so as to be movable only in the axial direction (vehicle width direction). The pinion shaft 9 is rotatably supported inside the pinion accommodating portion 13. The pinion shaft 9 has pinion teeth on an outer circumferential surface of a front half (lower half in FIG. 2) (not shown) disposed inside the pinion accommodating portion 13. A base end portion (upper end portion in FIG. 2) of the pinion shaft 9 protrudes to the outside of the housing 11 and is connected to the front universal joint 5*b*. The rack shaft 10 has rack teeth that mesh with the pinion teeth of the pinion shaft 9 on a part in a circumferential direction of an outer circumferential surface of the one side portion (right side portion in FIG. 1) in the axial direction (not shown) disposed inside the rack accommodating portion 12.

The electric assist device 8 includes a worm reducer 14 and an electric motor 15. The electric assist device 8 is configured to decelerate the rotation of the electric motor 15 by the worm reducer 14 and transmit the decelerated rotation to the pinion shaft 9.

The worm reducer 14 includes a housing 16, a worm wheel 17, a worm 18, a holder 19, a pad 20, and an elastic member 21.

The housing 16 includes a wheel accommodating portion 22, and a worm accommodating portion 23 that is disposed at a skew position with respect to the wheel accommodating portion 22 and whose axially intermediate portion is open to the wheel accommodating portion 22.

That is, a central axis of the wheel accommodating portion 22 and a central axis of the worm accommodating portion 23 are disposed at the skew position relative to each other. The axially intermediate portion of the worm accommodating portion 23 is integrally connected to one position in the circumferential direction of an outer end portion in a radial direction of the wheel accommodating portion 22, and an internal space of the worm accommodating portion 23 communicates with an internal space of the wheel accommodating portion 22 through the connected portion. In this example, the worm accommodating portion 23 is formed in a bottomed cylindrical shape, and specifically, a tip end (right end in FIG. 3) in the axial direction is closed, and a base end (left end in FIG. 3) in the axial direction is opened.

In this example, the wheel accommodating portion 22 is coaxially and integrally connected to an axially intermediate portion of the pinion accommodating portion 13 constituting the housing 11 of the steering gear unit 7. The internal space of the wheel accommodating portion 22 communicates with the internal space of the pinion accommodating portion 13.

The worm wheel 17 has wheel teeth 24 on an outer circumferential surface thereof and is rotatably supported inside the wheel accommodating portion 22. In this example, the worm wheel 17 is externally fitted and fixed to an axially intermediate portion of the pinion shaft 9.

The worm 18 has worm teeth 25 that mesh with the wheel teeth 24 at an axially intermediate portion of an outer circumferential surface thereof, and is rotatably supported inside the worm accommodating portion 23.

In this example, a base end portion (left end portion in FIG. 3) of the worm 18 is supported so as to be slightly swingable and displaceable with respect to the worm accommodating portion 23, and is connected to an output shaft 27 of the electric motor 15 so as to be able to transmit torque.

Therefore, in this example, the worm 18 has a female spline portion 26 on an inner circumferential surface of the base end portion. The electric motor 15 is coupled and fixed to a base end portion of the worm accommodating portion 23 in the axial direction by screwing in a state in which the output shaft 27 is disposed coaxially with the worm accommodating portion 23. The female spline portion 26 of the worm 18 and a male spline portion 28 provided on an outer circumferential surface of the output shaft 27 of the electric motor 15 are spline-engaged with each other. Accordingly, the base end portion of the worm 18 and the output shaft 27 of the electric motor 15 are connected to each other so as to enable torque transmission and slight swing displacement of the worm 18. The base end portion of the worm 18 is supported by a ball bearing 29 having a radial gap relative to the worm accommodating portion 23 so as to be slightly swingable and displaceable.

In this example, an outer circumferential surface of a tip end portion of the worm 18 is implemented by a stepped cylindrical surface. That is, the outer circumferential surface of the tip end portion of the worm 18 includes a small-diameter cylindrical surface portion 30 constituting a tip end side portion and a large-diameter cylindrical surface portion 31 constituting a base end side portion and having a larger diameter than the small-diameter cylindrical surface portion 30.

In this example, a support bearing 32 is disposed between the large-diameter cylindrical surface portion 31 of the worm 18 and an inner circumferential surface of the worm accommodating portion 23. In the illustrated example, the support bearing 32 is implemented by a ball bearing. That is, the support bearing 32 includes an inner ring 33 having an inner ring raceway on an outer circumferential surface thereof, an outer ring 34 having an outer ring raceway on an inner circumferential surface, and a plurality of balls 35 each of which is a rolling element disposed between the inner ring raceway and the outer ring raceway. However, as the support bearing 32, a rolling bearing such as a cylindrical roller bearing in which a rolling element is a cylindrical roller and a tapered roller bearing in which a rolling element is a tapered roller, or a slide bearing can also be used.

In this example, the inner ring 33 is externally fitted to the large-diameter cylindrical surface portion 31 of the worm 18 with a radial gap interposed therebetween. Further, in this example, a cylindrical bush 36 is disposed between an inner circumferential surface of the inner ring 33 and the large-diameter cylindrical surface portion 31. Specifically, the inner ring 33 is externally fitted to an outer circumferential surface of the bush 36 by interference fitting, and the bush 36 is externally fitted to the large-diameter cylindrical surface portion 31 of the worm 18 with a gap therebetween. The bush 36 is a member for ensuring slidability and/or cushioning properties with respect to the outer circumferential surface of the tip end portion of the worm 18. The bush 36 is preferably made of a material that has a small coefficient of friction with respect to a metallic material constituting the worm 18, such as a synthetic resin or a light alloy such as an aluminum alloy. However, the bush 36 may be omitted, or a bush externally fitted to the outer ring 34 by interference fitting may be internally fitted inside the worm accommodating portion 23 with a radial gap interposed therebetween.

In this example, the outer ring 34 is internally fitted inside the worm accommodating portion 23 with the gap therebetween. Accordingly, the preload of the support bearing 32 is prevented from changing even when the housing 16 thermally expands during use. However, when thermal expansion of the housing is not particularly problematic, the outer ring may be press-fitted into the housing.

As will be described later, the outer ring 34 is sandwiched in the axial direction between the holder 19 disposed inside the worm accommodating portion 23 and a retainer 37 internally fitted and fixed inside the worm accommodating portion 23. The retainer 37 includes a fitting cylindrical portion 38 internally fitted and fixed to the inner circumferential surface of the worm accommodating portion 23 by interference fitting, and an inward flange portion 39 bent from an end portion on one side of the fitting cylindrical portion 38 in the axial direction (right side of FIGS. 3 and 4) toward a radially inner side over the entire circumference. In this example, the outer ring 34 has an end surface on one side in the axial direction abutting on a radially outer side portion of a side surface on the other side (left side of FIGS. 3 and 4) in the axial direction of an annular portion 42 of the holder 19, and a side surface on the other side in the axial direction abutting on a side surface on one side of the inward flange portion 39 in the axial direction via a wave washer 40. Accordingly, axial direction displacement of the support bearing 32 is prevented. However, the wave washer 40 may be omitted, or a wave washer may be disposed between the outer ring 34 and the holder 19.

In this example, the tip end portion of the worm 18 can be displaced in a first direction (upper-lower direction in FIGS. 3 and 4), which is a direction of moving toward and away from the worm wheel 17 and a biasing direction by the elastic member 21, based on the radial gap present between the inner circumferential surface of the inner ring 33 and the outer circumferential surface of the tip end portion of the worm 18, specifically, an annular gap present between an inner circumferential surface of the bush 36 and the large-diameter cylindrical surface portion 31.

In this example, the support bearing 32 is sandwiched between the holder 19 and the retainer 37 in the axial direction, but when the worm reducer of the aspect of the present disclosure is implemented, the arrangement mode of the support bearing is not particularly limited as long as the tip end portion of the worm can rotate with respect to the worm accommodating portion and move toward and away from the worm wheel. For example, the holder may be internally fitted and fixed inside the worm accommodating portion, and the support bearing may be internally fitted and held inside the holder.

In the worm reducer 14 of this example, a central axis $O_{17}$ of the worm wheel 17 and a central axis $O_{18}$ of the worm 18 (a central axis of the output shaft 27 of the electric motor 15) are orthogonal to each other when viewed from the first direction. However, the present disclosure may also be applied to an oblique-type worm reducer in which the central axis $O_{17}$ of the worm wheel 17 and the central axis $O_{18}$ of the worm 18 (the central axis of the output shaft 27 of the electric motor 15) obliquely intersect each other, that is, form an acute angle when viewed from the first direction.

In the worm reducer 14 of this example, as shown in FIGS. 3 to 10, the holder 19, the pad 20, and the elastic member 21 are disposed between the small-diameter cylindrical surface portion 30 of the worm 18 and an inner circumferential surface of a tip end portion of the worm accommodating portion 23. The holder 19 is disposed between the tip end portion of the worm 18 and the worm accommodating portion 23. In this example, the holder 19 is disposed inside the worm accommodating portion 23 around the tip end portion of the worm 18 in a state in which rotation is prevented. The pad 20 is externally fitted to the tip end portion of the worm 18. In this example, the pad 20 is externally fitted to the tip end portion of the worm 18 without rattling in the radial direction. The elastic member 21 is assembled to the holder 19, and elastically biases the tip end portion of the worm 18 toward a worm wheel 17 side (lower side of FIGS. 3 and 4) via the pad 20. Accordingly, backlash at a meshing portion between the wheel teeth 24 and the worm teeth 25 is suppressed.

The holder 19 includes a held portion 74 that is internally fitted and held inside the worm accommodating portion 23 in a state in which rotation is prevented, and two guide portions 49 that protrude toward one side in a second direction (left-right direction in FIGS. 3 and 4), which is the axial direction of the worm accommodating portion 23, from two positions separated in a third direction (front-back direction in FIGS. 3 and 4) orthogonal to both the first direction and the second direction of a side surface on one side (right side of FIGS. 3 and 4) of the held portion 74 in the second direction. Further, the holder 19 has two holder inclined surfaces 41, which are two holder engagement portions, provided on inner side surfaces of the two guide portions 49 facing each other. The two holder inclined surfaces 41 each extend in the first direction and are inclined in directions approaching each other as they approach one side in the second direction. The holder 19 is preferably made of a material having sufficient strength and rigidity, for example, a metallic material or a highly functional resin material such as polyphenylene sulfide (PPS) mixed with glass fiber.

More specifically, in this example, as shown in FIGS. 12A to 13D and the like, the holder 19 includes an annular portion 42, a substantially circular ring-shaped side plate portion 43 extending toward the radially inner side from an end portion of the annular portion 42 on the one side in the second direction, and the protruding portion 44 extending from a radially inner end portion of the side plate portion 43 toward the one side in the second direction and having a substantially U-shaped end surface shape when viewed from the one side in the second direction. In this example, the held portion 74 includes the annular portion 42 and the side plate portion 43.

The annular portion 42 has a partially circular end surface shape including one straight portion and one arc portion when viewed from the one side in the second direction. That is, the annular portion 42 has a flat portion 45 at an end portion, of an outer circumferential surface, on a side close to the worm wheel 17 in the first direction. In this example, by fitting the annular portion 42 into the worm accommodating portion 23 in a non-circular shape, the holder 19 is held inside the worm accommodating portion 23 in a state in which the rotation is prevented.

Further, the annular portion 42 has a holder-side positioning engagement portion 75 at an end portion, of the outer circumferential surface, on a side far from the worm wheel 17 in the first direction. The holder-side positioning engagement portion 75 is provided on the outer circumferential surface of the annular portion 42 in the second direction. In this example, the holder-side positioning engagement portion 75 has a substantially triangular cross-sectional shape. However, when the worm reducer of the aspect of the present disclosure is implemented, the cross-sectional shape of the pad-side positioning engagement portion may be any shape such as a substantially rectangular shape or a substantially semicircular shape.

Figures 13A, 13B, 13C, 13D:
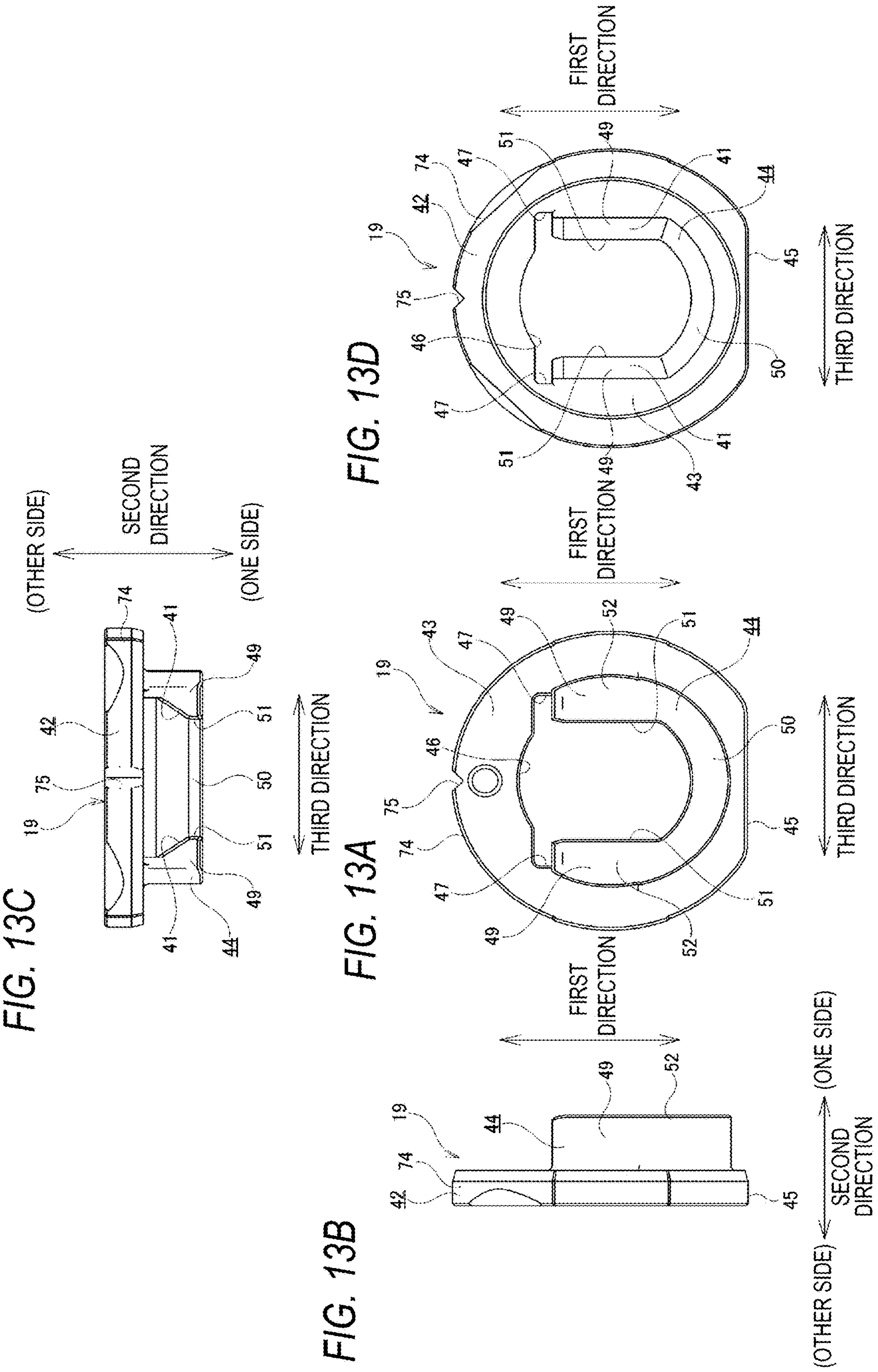
FIG. 13A is a view of the holder taken out and viewed from the right side of FIG. 4.
FIG. 13B is a view of the holder viewed from a left side of FIG. 13A.
FIG. 13C is a view of the holder viewed from an upper side of FIG. 13A.
FIG. 13D is a view of the holder viewed from a back side (left side of FIG. 4) of FIG. 13A.
Figure 14A:
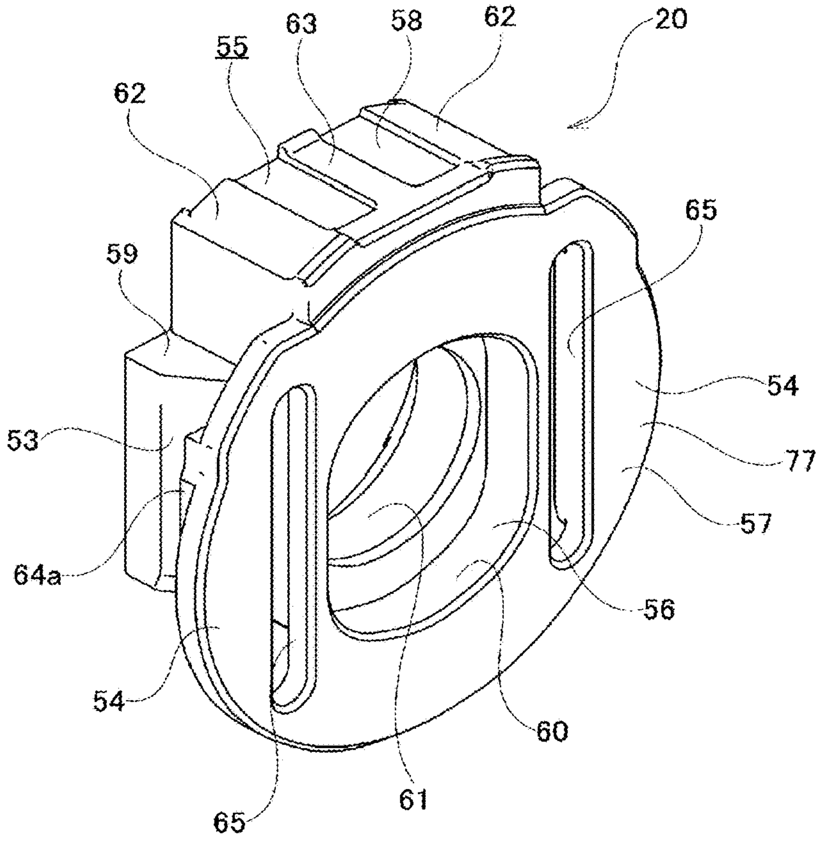
FIG. 14A is a perspective view showing a pad taken out.
Figure 14B:
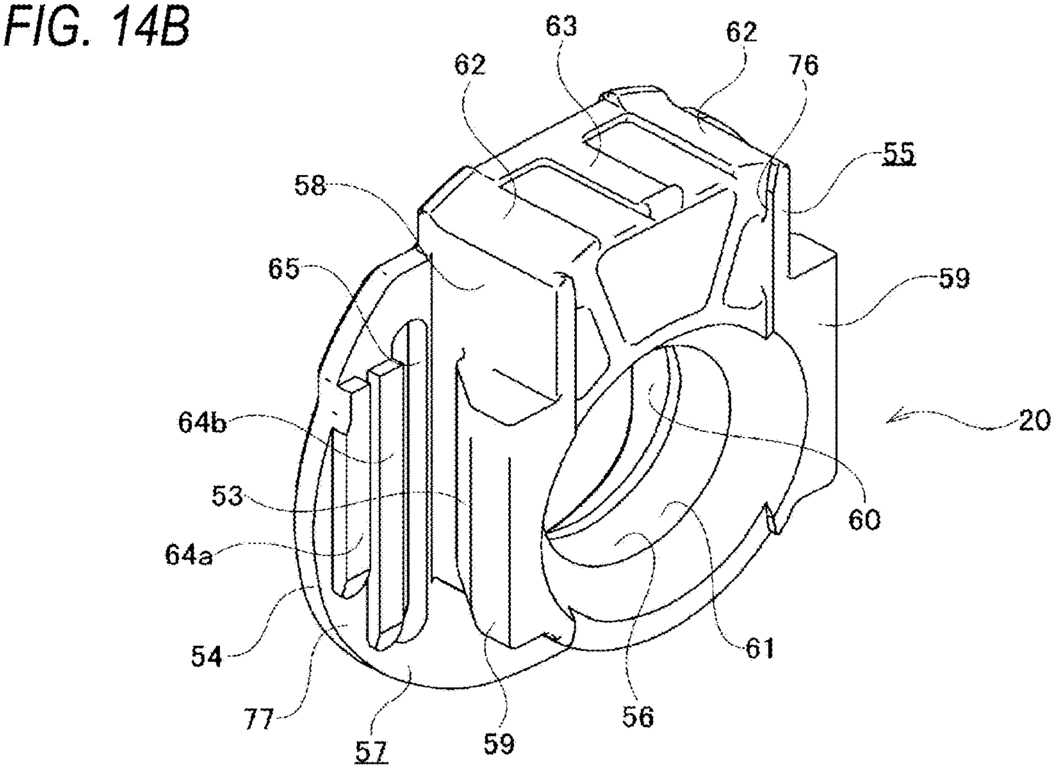
FIG. 14B is a perspective view viewed from a direction different from FIG. 14A.
Figures 15A, 15B, 15C, 15D:
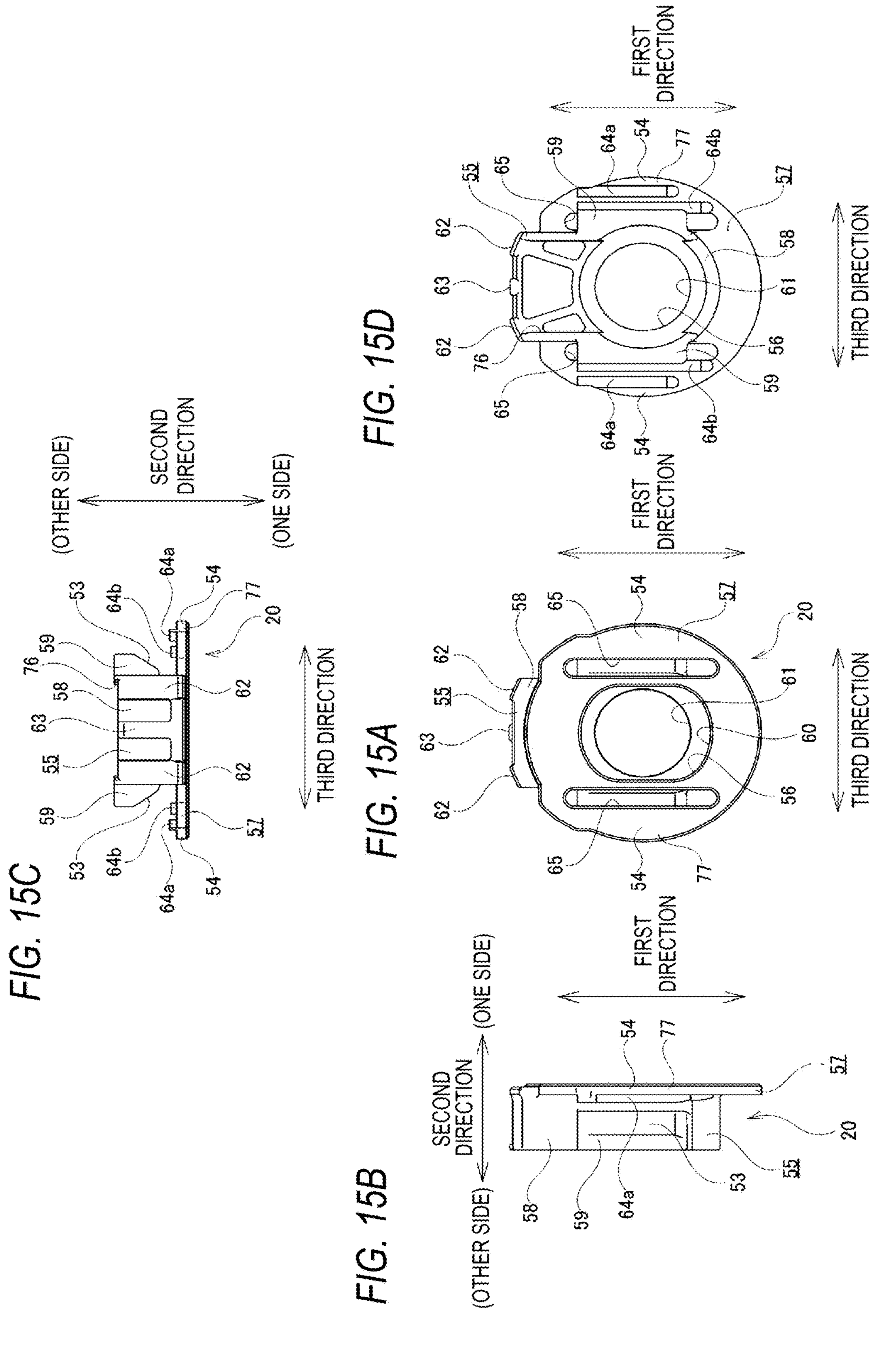
FIG. 15A is a view of the pad taken out and viewed from the right side of FIG. 4.
FIG. 15B is a view of the pad viewed from a left side of FIG. 15A.
FIG. 15C is a view of the pad viewed from an upper side of FIG. 15A.
FIG. 15D is a view of the pad viewed from a back side (left side of FIG. 4) of FIG. 15A.

In this example, as shown in FIG. 13D, an inner circumferential surface 46 of the side plate portion 43 has recessed portions 47 recessed toward both sides in the third direction on both side portions in the third direction. A bottom surface of the recessed portion 47 is implemented by a plane orthogonal to the third direction. Portions of the inner circumferential surface 46 of the side plate portion 43 offset from the two recessed portions 47, that is, both side portions in the first direction, are implemented by cylindrical surfaces centered on a central axis of the holder 19.

In this example, the side surface on the one side in the second direction of the end portion on a radially outer side of the side plate portion 43 abuts on a stepped portion 48 (see FIG. 3) facing the other side in the second direction provided on the inner circumferential surface of the worm accommodating portion 23, thereby preventing the holder 19 from being displaced to the one side in the second direction.

In this example, the protruding portion 44 protrudes toward the one side in the second direction from a portion of the radially inner end portion of the side plate portion 43 excluding an end portion on a side far from the worm wheel 17 in the first direction. That is, the end portion of the protruding portion 44 on the side far from the worm wheel 17 in the first direction is open. The protruding portion 44 includes the two guide portions 49 and a connection portion 50. The two guide portions 49 constitute end portions on both sides of the protruding portion 44 in the third direction. That is, as shown in FIGS. 6, 12A, 13A, and 13D, the two guide portions 49 extend toward the one side in the second direction from two locations separated in the third direction, of the radially inner end portion of the side plate portion 43, specifically, from the same locations in the circumferential direction as the two recessed portions 47. The two guide portions 49 have a shape extending in the first direction. The connection portion 50 constitutes an end portion of the protruding portion 44 on a side close to the worm wheel 17 in the first direction. That is, the connection portion 50 extends toward the one side in the second direction from the end portion, of the radially inner end portion of the side plate portion 43, on the side close to the worm wheel 17 in the first direction, and connects the end portions of the two guide portions 49 on the side close to the worm wheel 17 in the first direction. The connection portion 50 has a partially cylindrical shape centered on the central axis of the holder 19. If the holder has a strength sufficient to prevent deformation of the two guide portions, the connection portion may be omitted.

The two holder inclined surfaces 41 constituting the holder 19 are provided on the inner side surfaces 51, which are side surfaces facing each other in the third direction, of the two guide portions 49. In this example, each of the inner side surfaces 51 of the two guide portions 49 has a crank shape including a stepped surface (holder inclined surface 41) at an intermediate portion in the second direction when viewed from the first direction, as shown in FIG. 13C. That is, the two holder inclined surfaces 41 are provided at intermediate portions in the second direction of the inner side surfaces 51 of the two guide portions 49, more specifically, at one side portions of the intermediate portions in the second direction, respectively. The two holder inclined surfaces 41 are inclined in directions approaching each other as they approach the one side in the second direction. Of the inner side surfaces 51 of the two guide portions 49, portions located on the one side in the second direction with respect to the two holder inclined surfaces 41 and portions located on the other side in the second direction with respect to the two holder inclined surfaces 41 are each implemented by a plane orthogonal to the third direction. Therefore, a distance between the inner side surfaces 51 of the two guide portions 49 is narrower in a portion located on the one side in the second direction with respect to the two holder inclined surfaces 41 than in a portion located on the other side in the second direction with respect to the two holder inclined surfaces 41.

When the worm reducer of the aspect of the present disclosure is implemented, an inclination angle $\varphi$ of the holder inclined surface 41 with respect to the second direction can be set to any value in the range of $0° < \varphi < 90°$, but is preferably 20° or more and 80° or less, and more preferably 30° or more and 70° or less. In this example, the inclination angle $\varphi$ is 30°.

Further, the holder 19 has two holder pressed surfaces 52 on tip end surfaces of the two guide portions 49, which are end surfaces on the one side in the second direction. Each of the two holder pressed surfaces 52 is implemented by a flat surface orthogonal to the second direction. In this example, the two holder pressed surfaces 52 and a tip end surface of the connection portion 50, which is an end surface on one side in the second direction, are continuous with each other and are present in the same virtual plane orthogonal to the second direction.

As shown in FIGS. 6, 10, 11, and FIGS. 14A to 15D, the pad 20 includes a pad base portion 55 disposed between the two guide portions 49, two pad inclined surfaces 53 that are two pad engagement portions provided on side surfaces on both sides of the pad base portion 55 in the third direction and are in contact with the two holder inclined surfaces 41, a pad recessed portion 76 formed on a side surface of the pad base portion 55 on the other side in the second direction to extend in the first direction, and a pad elastic pressing portion 77 that applies a preload to contact portions between the two holder inclined surfaces 41 and the two pad inclined surfaces 53 by elastically pressing a part of the holder 19 toward the other side in the second direction.

In this example, the two pad inclined surfaces 53 are in surface contact with the two holder inclined surfaces 41, and specifically, are inclined at the same angle in the same direction as the two holder inclined surfaces 41 (see FIGS. 13A to 13D). In this example, the part of the holder 19 elastically pressed toward the other side in the second direction by the pad elastic pressing portion 77 is two holder pressed surfaces 52.

However, when the present disclosure is implemented, the part of the holder may be freely selected. For example, an end surface on one side in the second direction of the side plate portion constituting the holder may be used as the part of the holder (holder pressed surface), and the part of the holder may be elastically pressed toward the other side in the second direction by the pad elastic pressing portion provided on the base portion of the pad. The pad 20 is preferably made of a material that has a small coefficient of friction with respect to the metallic material constituting the worm 18, such as a synthetic resin or a light alloy such as an aluminum alloy.

In this example, the pad elastic pressing portion 77 includes two pad elastic pressing plates 54 that are located on the one side in the second direction with respect to the two pad inclined surfaces 53 and extend from a central portion of the pad 20 in the third direction toward sides away from each other in the third direction.

More specifically, the pad 20 includes the pad base portion 55 disposed between the two guide portions 49, and a through hole 56 that penetrates the pad base portion 55 in the second direction and through which the tip end portion of the worm 18 is inserted, and has the two pad inclined surfaces 53 on both side portions of the pad base portion 55 in the third direction, and a flat plate portion 57 including the two pad elastic pressing plates 54 is connected to a portion of the pad base portion 55 protruding from between the two guide portions 49 to the one side in the second direction.

The pad base portion 55 includes a base portion body 58 and two base portion overhang portions 59.

The base portion body 58 extends in the first direction and has a substantially rectangular end surface shape. The through hole 56 penetrates, in the second direction, a half of the base portion body 58 on a side close to the worm wheel 17 in the first direction. In this example, the through hole 56 is implemented by a stepped hole having an oval hole portion 60 on the one side in the second direction and a circular hole portion 61 on the other side in the second direction. Of these, the circular hole portion 61 has an inner diameter slightly larger than an outer diameter of the small-diameter cylindrical surface portion 30 of the worm 18.

Further, the base portion body 58 has, at an end portion on a side far from the worm wheel 17 in the first direction, two pressed portions 62 at end portions on both sides in the third direction of the other side portion in the second direction. Each of the two pressed portions 62 is implemented by a partially cylindrical surface centered on a central axis of the through hole 56. The base portion body 58 has a pedestal surface portion 63 implemented by a flat surface orthogonal to the first direction at an end portion on a side far from the worm wheel 17 in the first direction and between the two pressed portions 62 in the third direction.

The two base portion overhang portions 59 protrude from a portion, of a half of the base portion body 58 on the other side in the second direction, on a side close to the worm wheel 17 in the first direction toward sides away from each other in the third direction. Each of the two base portion overhang portions 59 extends in the first direction.

The two pad inclined surfaces 53 are provided on side surfaces on the one side in the second direction of the two base portion overhang portions 59. The two pad inclined surfaces 53 are inclined in directions approaching each other as they approach the one side in the second direction. An inclination angle φ of the pad inclined surface 53 with respect to the second direction is the same as the inclination angle φ of the holder inclined surface 41 with respect to the second direction.

The pad recessed portion 76 is formed on a side surface of the base portion body 58 on the other side in the second direction over the first direction. That is, the pad recessed portion 76 is open to end surfaces on both sides of the base portion body 58 in the first direction. A bottom surface (a surface facing the other side in the second direction) of the pad recessed portion 76 is located on the one side in the second direction with respect to the end surfaces of the two base portion overhang portions 59 on the other side in the second direction. In this example, the pad recessed portion 76 has a rectangular cross-sectional shape.

However, when the worm reducer of an aspect of the present disclosure is implemented, the cross-sectional shape of the pad recess is not limited to the rectangular shape, and as will be described later, the pad recessed portion may have any shape as long as the pad can be prevented from being displaced in the third direction by engaging a guide convex portion provided on a guide jig with the pad recessed portion when the pad is assembled to the holder. The pad recessed portion may be formed only in a part of the side surface of the base portion body on the other side in the second direction in the first direction, or may be formed at a plurality of positions in the first direction.

The flat plate portion 57 is integrally connected to an end portion of the base portion body 58 on the one side in the second direction, and has a circular outer circumferential shape when viewed from the one side in the second direction. The through hole 56 penetrates a radially central portion of the flat plate portion 57 in the second direction. Therefore, the flat plate portion 57 is formed in a circular ring flat plate shape centered on the central axis of the through hole 56. An outer diameter dimension of the flat plate portion 57 is larger than a width dimension of the base portion body 58 in the third direction. End portions on both sides of the flat plate portion 57 in the third direction protrude further toward both sides in the third direction than the base portion body 58. An end portion of the flat plate portion 57 on a side close to the worm wheel 17 in the first direction protrudes to a side close to the worm wheel 17 than the base portion body 58 in the first direction. An end portion of the base portion body 58 on a side far from the worm wheel 17 in the first direction protrudes farther from the worm wheel 17 than the flat plate portion 57 in the first direction.

In this example, the two pad elastic pressing plates 54 constituting the pad 20 are connected to a portion of the pad base portion 55 protruding from between the two guide portions 49 to the one side in the second direction. Specifically, the two pad elastic pressing plates 54 are implemented by the end portions on both sides of the flat plate portion 57 in the third direction.

In this example, as shown in FIGS. 10, 11, 14B, and 15B to 15D, each of the two pad elastic pressing plates 54 includes ridges 64*a* and 64*b* extending in the first direction on the side surface on the other side in the second direction. In this example, each of the two pad elastic pressing plates 54 includes the two ridges 64*a* and 64*b*. In a free state before the two pad elastic pressing plates 54 are elastically deformed, in other words, in a free state before the pad 20 is assembled to the protruding portion 44 of the holder 19, the height of the at least one ridge 64*a*, 64*b* in the second direction increases continuously or stepwise as a distance from the worm 18 in the third direction increases.

Figure 17A:
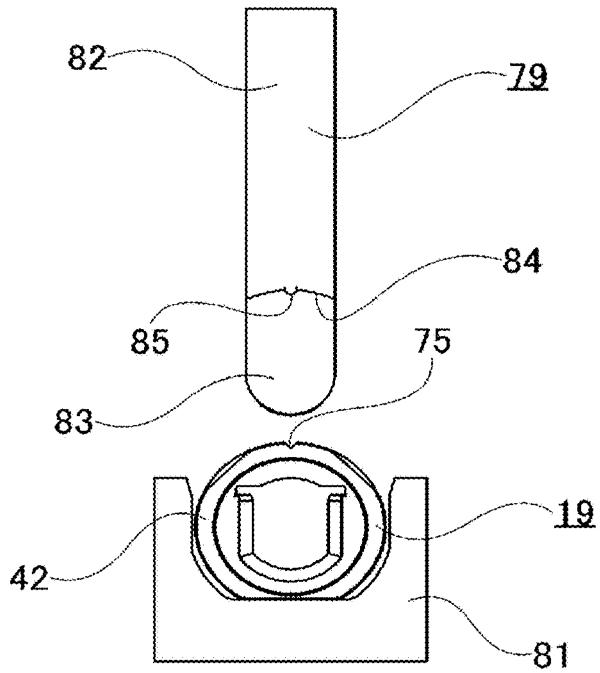
FIGS. 17A and 17B are views illustrating a method for positioning a guide jig with respect to the holder.

In this example, as at least one ridge 64*a*, 64*b*, two ridges 64*a* and 64*b* disposed apart from each other in the third direction are provided. As shown in FIG. 17A, in the free state, of the two ridges 64*a* and 64*b*, the height of the ridge 64*a* in the second direction on the side far from the worm 18 in the third direction is higher than the height of the ridge 64*b* in the second direction on the side close to the worm 18 in the third direction. In this example, in the free state, the cross-sectional shape of the tip end portion of each of the two ridges 64*a* and 64*b* is a linear shape orthogonal to the second direction. More specifically, in the free state, the tip end portion of each of the two ridges 64*a* and 64*b* is implemented by a flat surface orthogonal to the second direction.

In this example, each of the two pad elastic pressing plates 54 has a slit 65 penetrating in the second direction and extending in the first direction at a base end portion that is an end portion on a central side of the pad 20 in the third direction. In this example, a bending rigidity, of the base end portion of the pad elastic pressing plate 54, in the second direction of the portions adjacent to both sides of the slit 65 in a length direction is adjusted by appropriately regulating a width and length of the slit 65, a plate thickness of the pad elastic pressing plate 54, and the like. However, when the worm reducer of the aspect of the present disclosure is implemented, the slit may be omitted.

As shown in FIGS. 3 to 5 and FIGS. 7 to 10, the pad 20 is assembled to the protruding portion 44 of the holder 19 and externally fitted to the tip end portion of the worm 18.

Specifically, the two pad inclined surfaces 53 are in surface contact with the two holder inclined surfaces 41 in a state in which a portion of the pad base portion 55 of the pad 20 on a side close to the worm wheel 17 in the first direction is disposed between the two guide portions 49 constituting the protruding portion 44 of the holder 19. The tip end portions of the ridges 64*a* and 64*b* of the two pad elastic pressing plates 54 elastically press the two holder pressed surfaces 52 toward the other side in the second direction. Accordingly, the preload is applied to the contact portions between the two holder inclined surfaces 41 and the two pad inclined surfaces 53.

Further, the small-diameter cylindrical surface portion 30 of the tip end portion of the worm 18 is internally fitted into the circular hole portion 61 of the through hole 56 of the pad 20 so as to be relatively rotatable without rattling in the radial direction.

In this state, a gap in the first direction is present between a side surface of the pad base portion 55 of the pad 20 on a side close to the worm wheel 17 in the first direction and a side surface of the connection portion 50 constituting the protruding portion 44 of the holder 19 on a side far from the worm wheel 17 in the first direction. In this example, the pad 20 can be displaced in the first direction with respect to the holder 19 based on the gap in the first direction.

Figure 10:
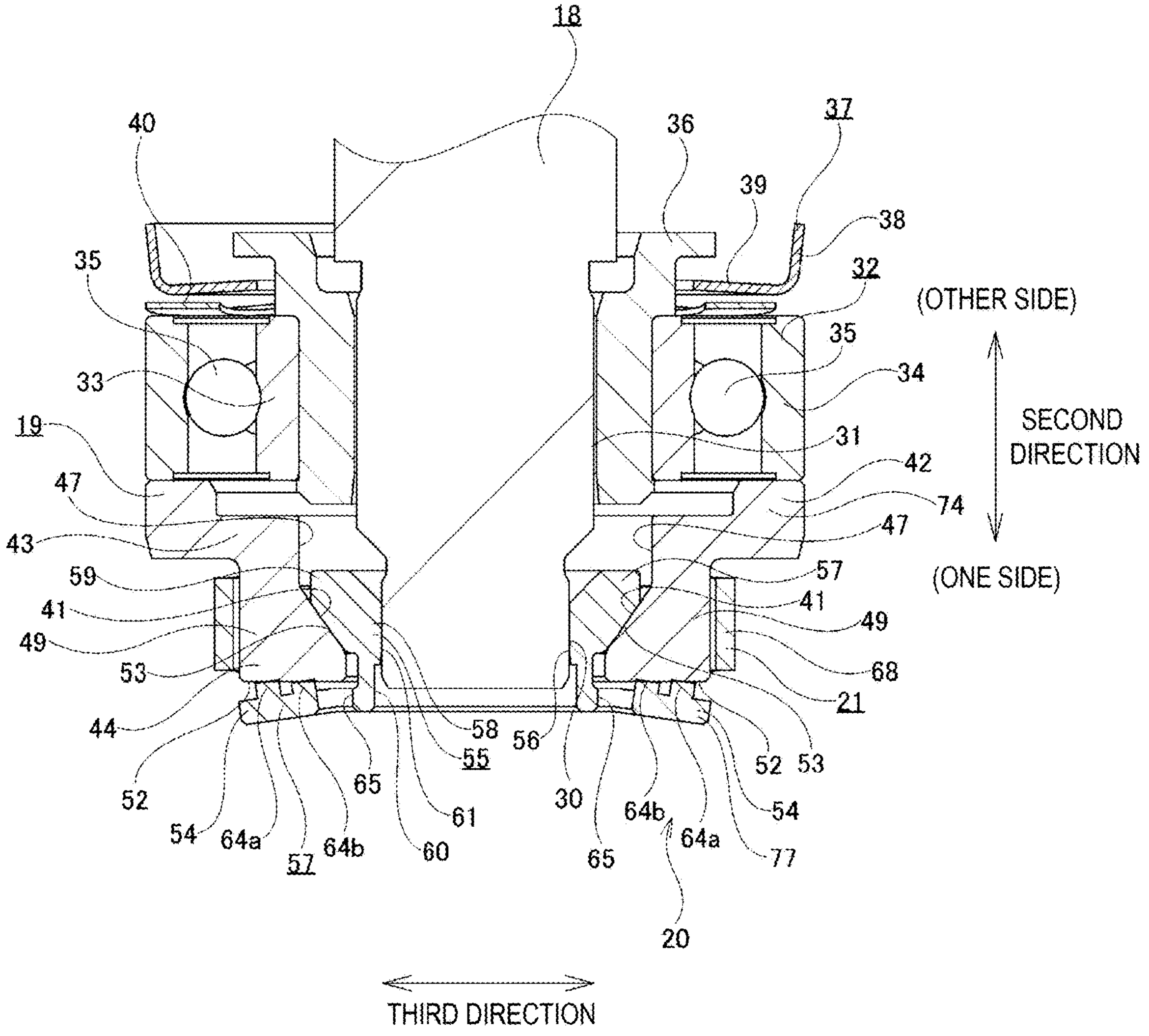
FIG. 10 is a cross-sectional view taken along a line B-B of FIG. 7.
Figure 11:
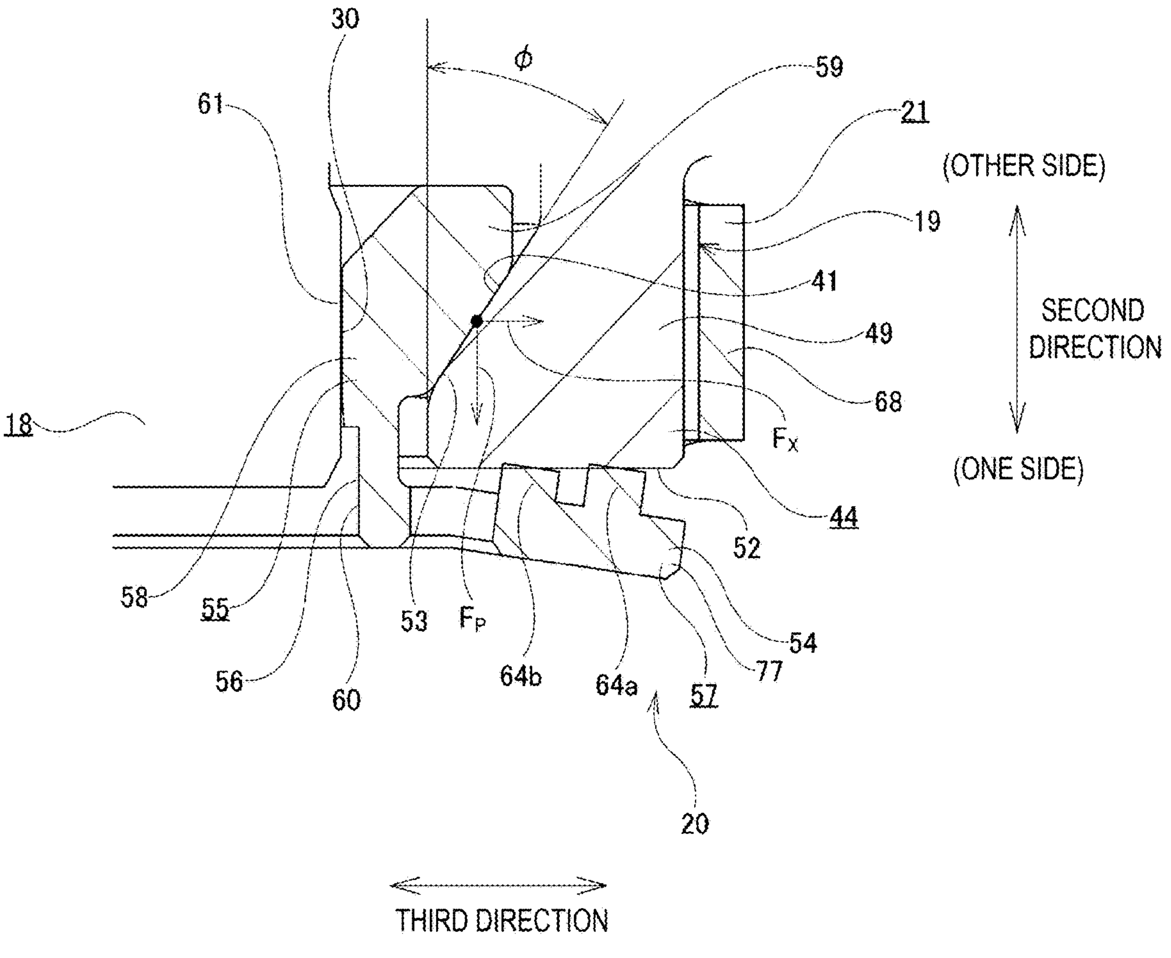
FIG. 11 is a partially enlarged view of FIG. 10.
Figure 12A:
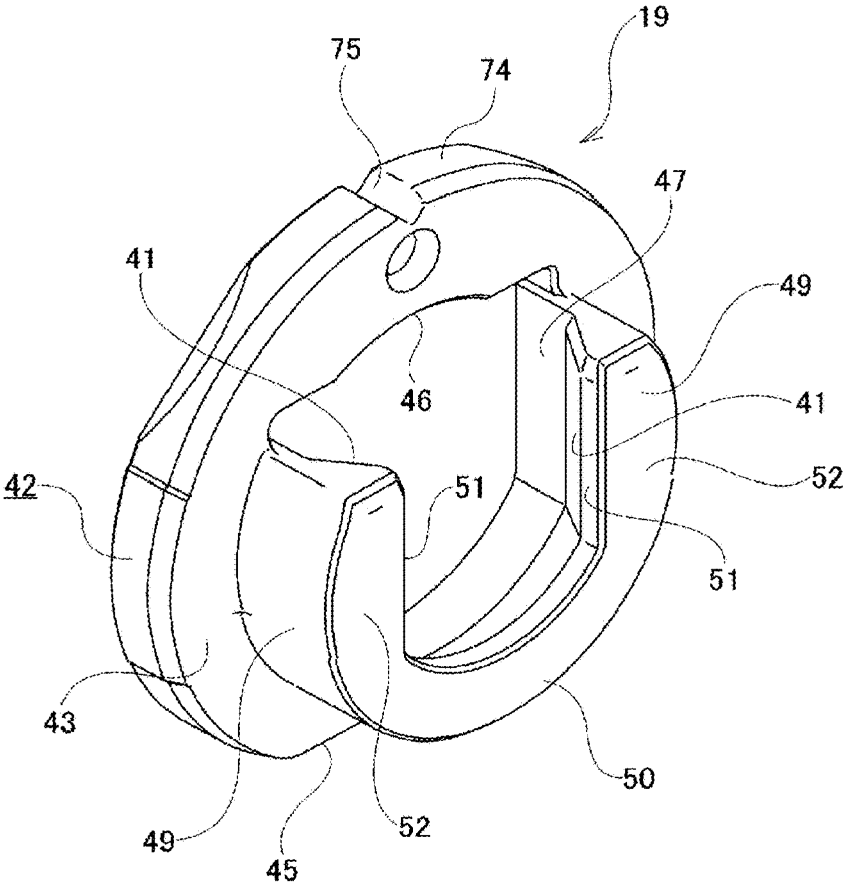
FIG. 12A is a perspective view showing a holder taken out.
Figure 12B:
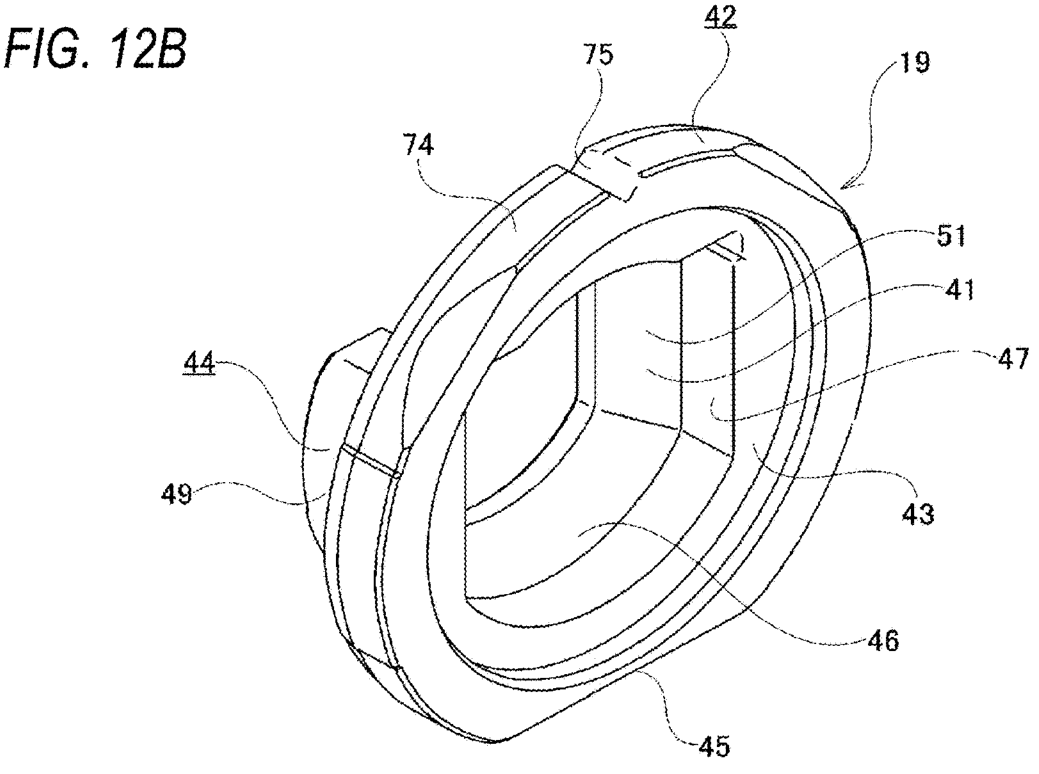
FIG. 12B is a perspective view viewed from a direction different from FIG. 12A.

In this state, as shown in FIGS. 10 and 11, a gap in the third direction is present between the pad base portion 55 of the pad 20 and, of the inner side surfaces 51 of the two guide portions 49, each of the portions located on the one side in the second direction with respect to the two holder inclined surfaces 41 and the portions located on the other side in the second direction with respect to the two holder inclined surfaces 41. In this example, the pad 20 can be displaced in the third direction with respect to the holder 19 based on the gap in the third direction.

Figure 6:
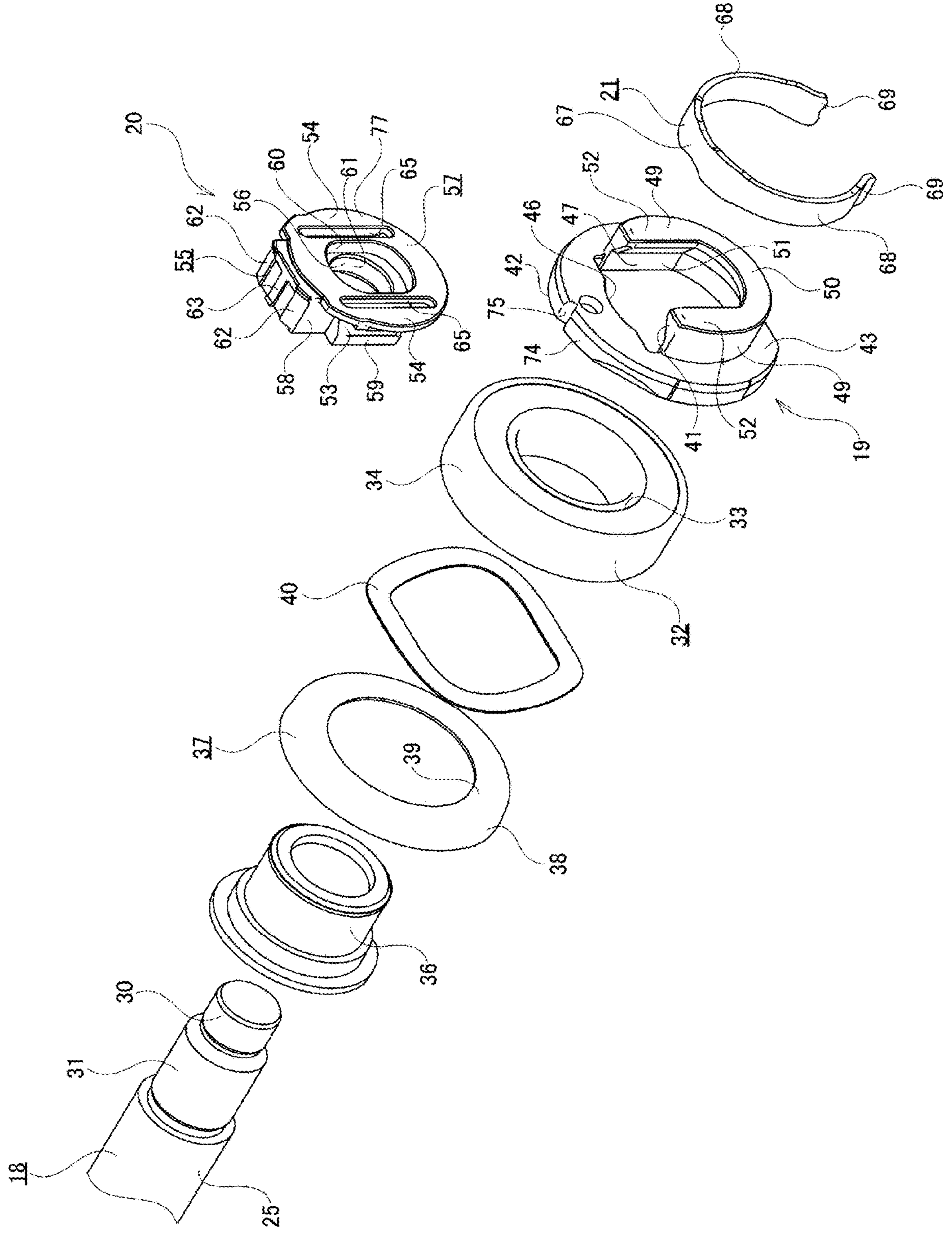
FIG. 6 is an exploded perspective view showing the tip end portion of the worm and the members disposed around the tip end portion.
Figure 7:
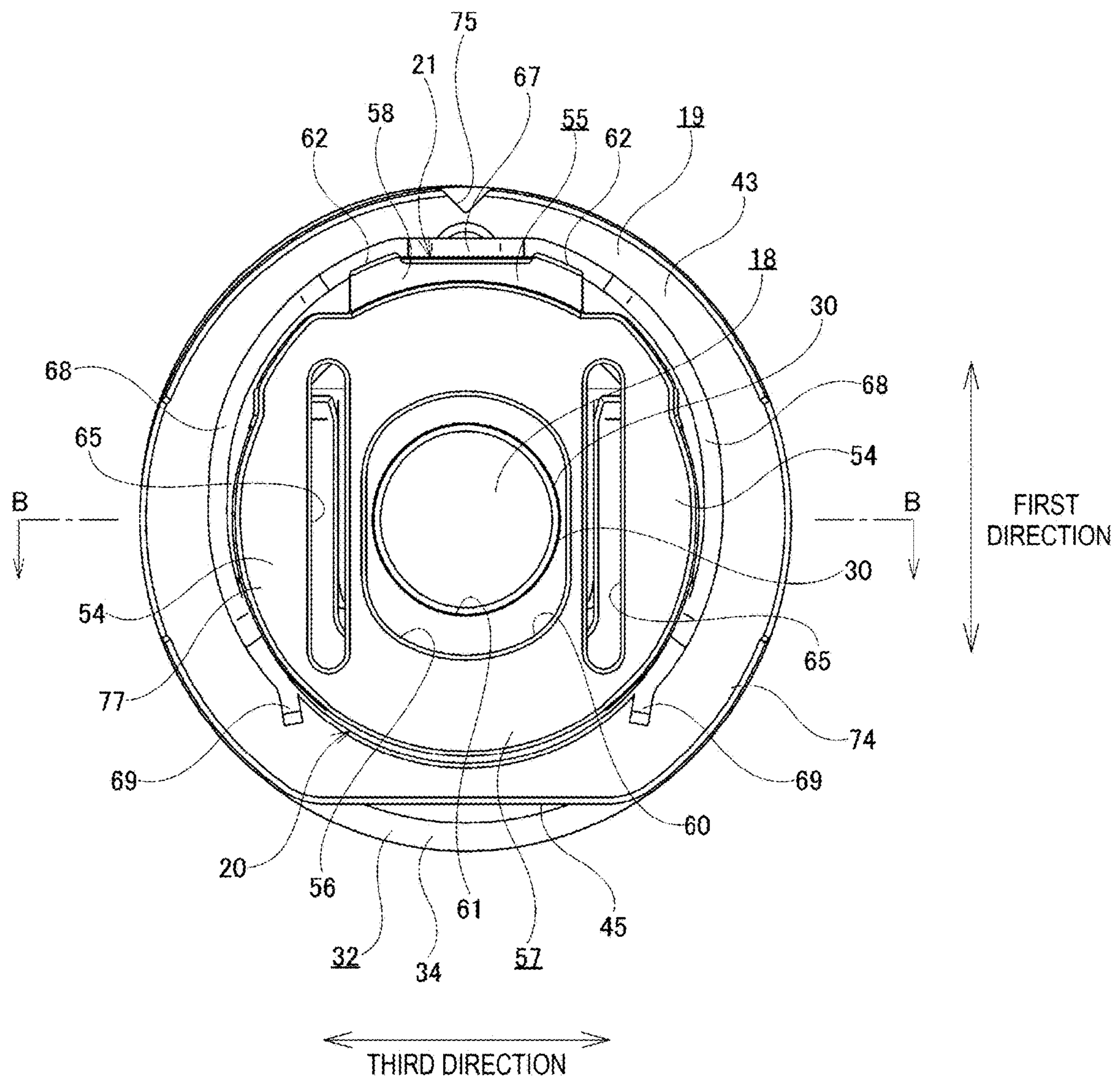
FIG. 7 is a right side view of FIG. 4.
Figure 8:
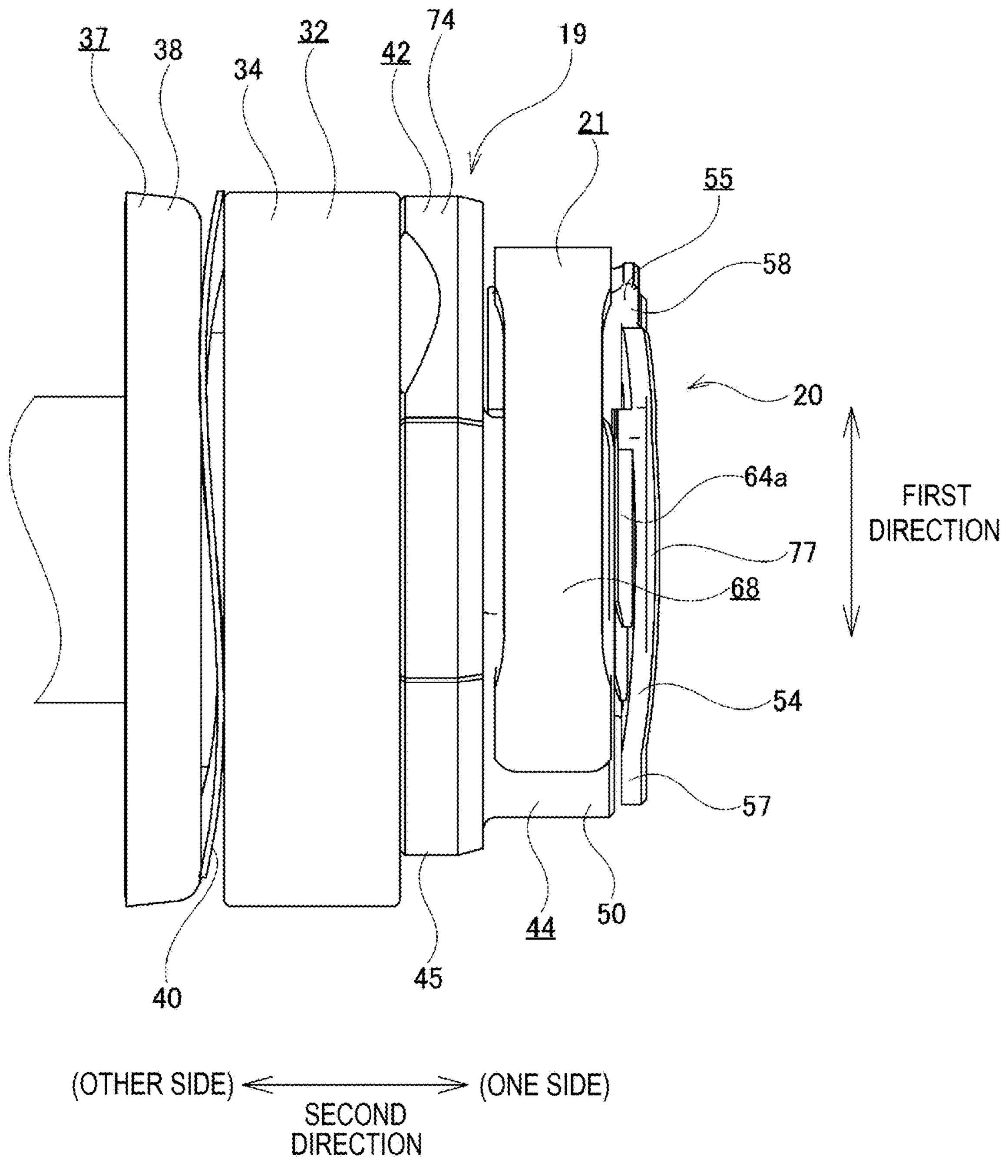
FIG. 8 is a left side view of FIG. 7.
Figure 9:
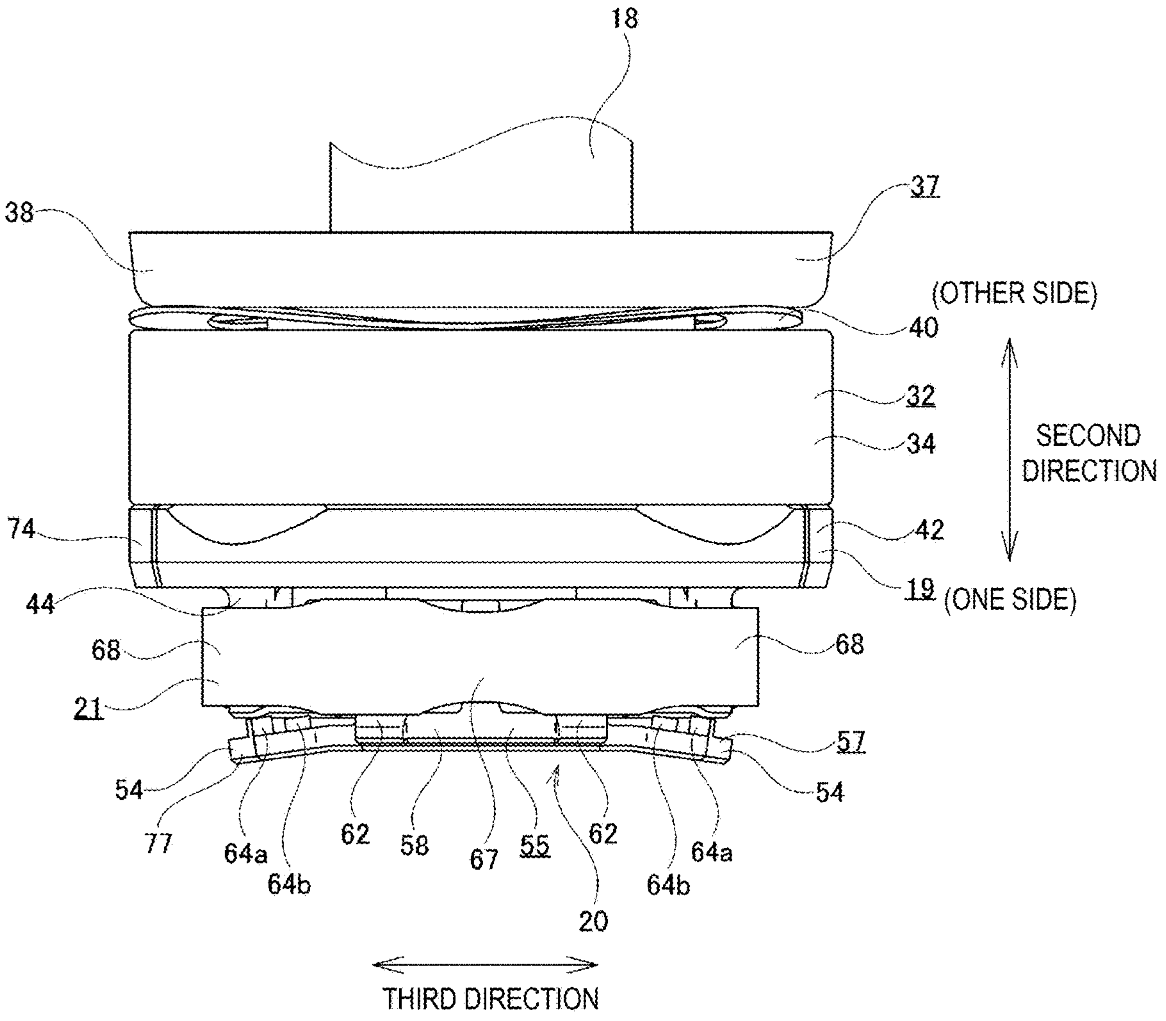
FIG. 9 is a top view of FIG. 7.
Figure 16:
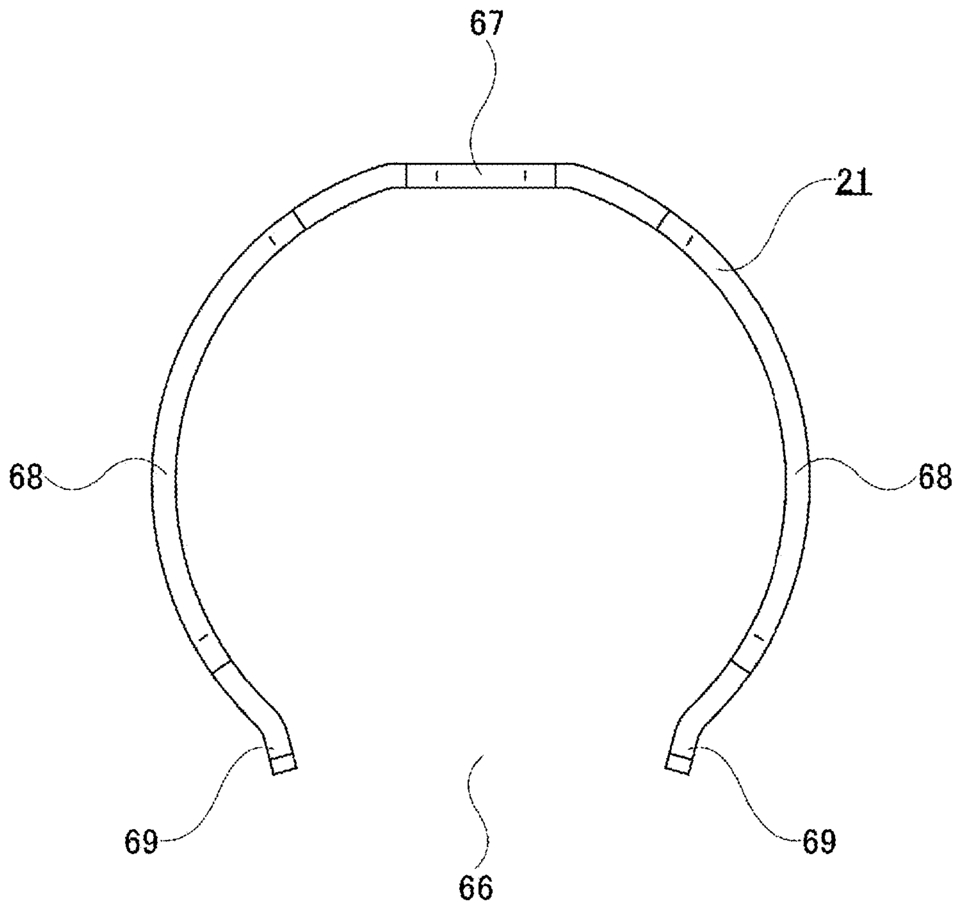
FIG. 16 is a view of an elastic member taken out and viewed from the right side of FIG. 4.

In this example, the elastic member 21 is implemented by a plate spring. More specifically, in this example, as shown in FIGS. 6 and 16, the elastic member 21 is implemented by a cut-out cylindrical plate spring having a discontinuous portion 66 at one position in the circumferential direction. Specifically, the elastic member 21 includes a base portion 67 located on a side far from the worm 18 in the first direction, and the two arm portions 68 extending in the circumferential direction from end portions on both sides of the base portion 67 in the circumferential direction.

In this example, the base portion 67 is implemented by a flat plate orthogonal to the first direction.

Each of the two arm portions 68 is formed in a partially cylindrical shape. Each of the two arm portions 68 has a bent portion 69 bent radially outward from the tip end portion.

However, when the worm reducer of the aspect of the present disclosure is implemented, the elastic member can have any configuration as long as the pad can be elastically biased toward the worm wheel 17 side in the first direction. For example, when the elastic member is implemented by a plate spring, the elastic member may have a shape other than a partially cylindrical shape. Further, the elastic member may be implemented by a torsion coil spring.

The elastic member 21 is assembled to the holder 19 so as to be externally fitted to the pad base portion 55 of the pad 20 and the two guide portions 49. In this example, in a state in which the pad base portion 55 of the pad 20 and the protruding portion 44 of the holder 19 are inserted into a radially inner side of the elastic member 21, the base portion 67 of the elastic member 21 abuts on the pedestal surface portion 63 of the pad 20, inner circumferential surfaces of base end side portions of the two arm portions 68 are elastically pressed against the two pressed portions 62, and inner circumferential surfaces of tip end side portions of the two arm portions 68 are elastically pressed against the side surface of the connection portion 50 constituting the protruding portion 44 of the holder 19 on the side close to the worm wheel 17 in the first direction. Accordingly, the tip end portion of the worm 18 is elastically biased toward the worm wheel 17 side, that is, toward the side close to the worm wheel 17 in the first direction via the pad 20. Accordingly, the backlash at the meshing portion between the wheel teeth 24 and the worm teeth 25 is suppressed.

In the worm reducer 14 of this example, the two pad inclined surfaces 53 constituting the pad 20 are in surface contact with the two holder inclined surfaces 41 constituting the holder 19. Further, the tip end portions of the respective ridges 64*a* and 64*b* of the two pad elastic pressing plates 54 constituting the pad 20 elastically press the two holder pressed surfaces 52 constituting the holder 19 toward the other side in the second direction. Accordingly, the preload is applied to the contact portions between the two holder inclined surfaces 41 and the two pad inclined surfaces 53. Therefore, the displacement of the pad 20 in the third direction with respect to the holder 19 is regulated based on the contact between the two holder inclined surfaces 41 and the two pad inclined surfaces 53, thereby preventing the pad 20 from rattling without resistance in the third direction with respect to the holder 19.

Specifically, in this example, as shown in FIGS. 10 and 11, the tip end portions of the ridges 64*a* and 64*b* of the pad elastic pressing plate 54 elastically press the holder pressed surface 52 toward the other side in the second direction, so that an elastic force (pre-pressure) Fp directed toward the one side in the second direction acts on the holder inclined surface 41 from the pad inclined surface 53. Then, the elastic force Fp is converted into an elastic force (pre-pressure) Fx acting on the holder inclined surface 41 from the pad inclined surface 53 and directed outward in the third direction. In the structure of this example, based on the elastic force Fx, the pad 20 can be prevented from rattling without resistance in the third direction with respect to the holder 19.

Therefore, as a rotation direction of the worm 18 is changed, the tip end portion of the worm 18 is less likely to be displaced in the third direction even when the direction of a component in the third direction, of a reaction force applied from the wheel teeth 24 to the worm teeth 25, is changed. As a result, it is possible to prevent abnormal noise such as tooth rattling noise from occurring at the meshing portion between the wheel teeth 24 and the worm teeth 25, and to prevent abnormal noise such as collision noise from occurring between the pad 20 and the holder 19.

When the worm reducer of the aspect of the present disclosure is implemented, the bending rigidity in the second direction of the portions adjacent to both sides of the slit 65 in the length direction, of the base end portion of the pad elastic pressing plate 54, can be changed by changing the width and length of the slit 65, the plate thickness of the pad elastic pressing plate 54, the height of the ridges 64*a* and 64*b* in the second direction, and the like. Accordingly, it is possible to change the magnitude of the force with which the tip end portions of the ridges 64*a* and 64*b* of the pad elastic pressing plate 54 elastically press the holder pressed surfaces 52 toward the other side in the second direction. Accordingly, the magnitude of the elastic force Fp can be freely changed.

The pad elastic pressing plate 54 locally presses the holder pressed surface 52 by the tip end portions of the ridges 64*a* and 64*b*. Therefore, the pressing force can be stabilized as compared with a case where the pad elastic pressing plate presses the holder pressed surface in a wide range.

A relational expression of "$Fx=Fp/\tan\varphi$" is established between the elastic force Fx and the elastic force Fp. In this example, since the inclination angle $\varphi=30°$, $Fx=Fp/\tan 30°=1.7$ Fp. That is, the elastic force Fx becomes larger than the elastic force Fp. When the worm reducer of the aspect of the present disclosure is implemented, the magnitude of the elastic force Fx can be freely changed by changing not only the magnitude of Fp but also the magnitude of the inclination angle $\varphi$. For example, if $p=45°$, $Fx=Fp$, if $45°<\varphi<90°$, $Fx<Fp$, and if $0°<\varphi<45°$, $Fx>Fp$. Further, the magnitude of the elastic force Fx can be adjusted by changing the inclination angle $\varphi$ without changing the material (elastic force based on the material) of the pad 20. Therefore, the magnitude of the elastic force Fx can be easily adjusted in a design stage.

When the worm reducer of the aspect of the present disclosure is implemented, the inclination angle of the holder inclined surface 41 with respect to the second direction and the inclination angle of the pad inclined surface 53 with respect to the second direction do not need to be exactly the same, and may be different within a range of manufacturing errors. Further, the inclination angle of the holder inclined surface 41 with respect to the second direction can be slightly smaller (for example, about 0.5°) than the inclination angle of the pad inclined surface 53 with respect to the second direction. In this way, in the contact portion between the holder inclined surface 41 and the pad inclined surface 53, the tip end portion (the end portion on the right side in the third direction in FIG. 11, the end portion on the other side in the second direction in FIG. 11) of the pad inclined surface 53 comes into particularly strong surface contact with the holder inclined surface 41. As a result, the posture of the pad 20 with respect to the holder 19 is stabilized.

When viewed from the first direction, as shown in FIGS. 10 and 11, a case where the pad 20 is displaced from a neutral state, which is a state in which the central axis of the holder 19 and a central axis of the pad 20 coincide with each other, to any one side in the third direction with respect to the holder 19, for example, to a right side in FIGS. 10 and 11 will be considered. In this case, along with sliding displacement of the right pad inclined surface 53 along the right holder inclined surface 41, the pad base portion 55 of the pad 20 is displaced toward the other side in the second direction, and at the same time, the right pad elastic pressing plate 54 is elastically deformed so as to tilt toward the one side in the second direction. The elastic forces Fp and Fx increase as the elastic pressing force acting on the right holder pressed surface 52 from the right pad elastic pressing plate 54 increases by an amount corresponding to the amount of elastic deformation. As a result, the pad 20 is much less likely to be displaced toward the right side. The same applies to a case where the pad 20 is displaced from the neutral state to a left side in FIGS. 10 and 11 with respect to the holder 19.

An inner circumferential surface of a central portion of the elastic member 21 in the circumferential direction is elastically pressed against the two pressed portions 62 provided at the end portions on both sides of the base portion body 58 in the third direction constituting the pad 20. Therefore, a force having not only a component in a direction approaching the worm wheel 17 in the first direction but also components in opposite directions in the third direction is applied to the two pressed portions 62. From this aspect as well, the tip end portion of the worm 18 can be prevented from being displaced in the third direction when the rotation direction of the worm 18 is changed.

Further, according to the worm reducer 14 of this example, the workability of assembly work of the worm reducer 14 can be improved. Specifically, the workability of work of assembling the pad 20 to the holder 19 can be improved.

When the pad 20 is assembled to the holder 19, the pad base portion 55 is inserted between the two guide portions 49 from an end portion of the protruding portion 44 on a side far from the worm 18 in the first direction.

In this example, the pad base portion 55 has the pad recessed portion 76 provided over the first direction on the side surface on the other side in the second direction.

Therefore, in this example, the holder 19 is disposed with respect to a guide jig 79 having a guide convex portion 78 extending in a predetermined direction such that the first direction coincides with an extending direction of the guide convex portion 78 and a center position between the two guide portions 49 in the third direction coincides with the center position of the guide convex portion 78 in the width direction, and the pad 20 is moved along the guide convex portion 78 in a state where the guide convex portion 78 is inserted inside the pad recessed portion 76, so that the pad base portion 55 can be disposed between the two guide portions 49.

Figure 18A:
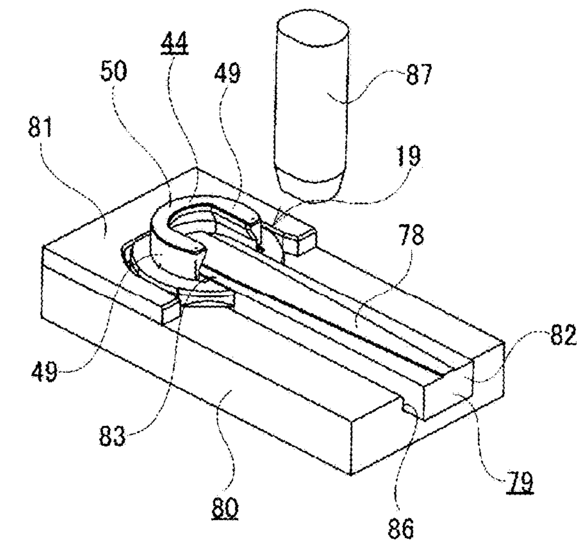
FIGS. 18A to 18C are views sequentially showing a process of assembling the pad to the holder.

More specifically, when the pad 20 is assembled to the holder 19, first, as shown in FIG. 18A, the holder 19 is placed on the holding jig 80 with one side in the second direction facing upward, and a restraint jig 81 is placed on an upper surface of the holding jig 80 so as to surround a portion around an annular portion 42 of the holder 19 excluding a portion far from the worm 18 in the first direction.

Next, the guide jig 79 is placed on the upper surface of the holding jig 80. The guide jig 79 has a substantially rectangular columnar shape. Specifically, the guide jig 79 includes a substantially rectangular columnar base portion 82 and a tongue-shaped portion 83 extending from an upper portion of a tip end portion of the base portion 82. The guide convex portion 78 is provided to extend over an upper surface of the base portion 82 and an upper surface of the tongue-shaped portion 83. In this example, a width dimension of the guide convex portion 78 increases from a base end portion (lower right portion in FIG. 18A) toward a tip end portion (upper left portion in FIG. 18A). Further, the base portion 82 has an abutting surface 84 that is a concave curved surface having a radius of curvature equal to or slightly larger than a radius of curvature of the outer circumferential surface of the annular portion 42 of the holder 19 on a lower side portion of the tip end portion, and has a jig-side positioning engagement portion 85 engaged with the holder-side positioning engagement portion 75 on a central portion of the abutting surface 84.

Figure 17B:
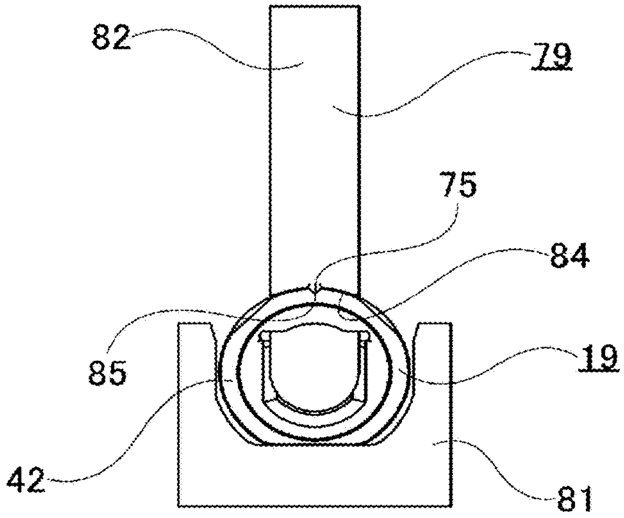

The base portion 82 of the guide jig 79 is disposed inside the recessed portion 86 provided on the upper surface of the holding jig 80, and the tongue-shaped portion 83 is inserted inside the protruding portion 44. Then, as shown in FIGS. 17A and 17B, the abutting surface 84 of the guide jig 79 abuts on an end portion of the outer circumferential surface of the annular portion 42 of the holder 19 on a side far from the worm 18 in the first direction, and the jig-side positioning engagement portion 85 is engaged with the holder-side positioning engagement portion 75. Accordingly, the guide jig 79 is positioned with respect to the holder 19. In particular, based on the engagement between the jig-side positioning engagement portion 85 and the holder-side positioning engagement portion 75, the guide jig 79 and the holder 19 are positioned in the third direction, and the center position between the two guide portions 49 in the third direction is made to coincide with the center position of the guide convex portion 78 in the width direction.

Figure 18B:
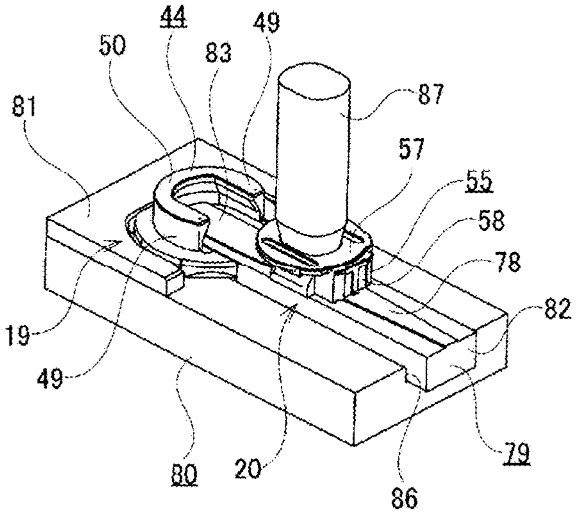
Figure 18C:
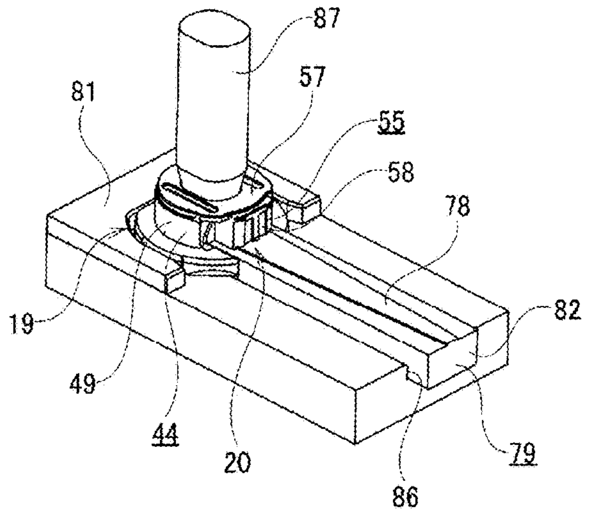

Next, as shown in FIGS. 18A to 18C, the pad 20 is placed on the base portion 82 of the guide jig 79 with the other side in the second direction facing downward, the guide convex portion 78 is disposed (inserted) inside the pad recessed portion 76, and the insertion jig 87 having a substantially oval columnar shape is inserted into the through-hole 56 of the pad 20 from above. Then, as shown in FIGS. 18B and 18C, the insertion jig 87 is moved in a direction approaching the holder 19 with respect to the extending direction of the guide convex portion 78. Accordingly, the pad 20 is moved (guided) toward the holder 19 along the guide convex portion 78, and the pad base portion 55 is disposed between the two guide portions 49.

As described above, according to the assembly method of this example, when the pad 20 is assembled to the holder 19, the insertion of the pad base portion 55 between the two guide portions 49 can be guided by inserting the guide convex portion 78 inside the pad recessed portion 76. That is, when the pad 20 is moved toward the holder 19, the pad 20 can be prevented from being displaced in the third direction. Therefore, the workability of the work of assembling the pad 20 to the holder 19 can be improved. Further, the work of assembling the pad 20 to the holder 19 can be easily automated. In particular, even in a structure in which there is no gap between the holder 19 and the pad 20 in the third direction as in the worm reducer 14 of this example, the workability of the work of assembling the pad 20 to the holder 19 can be improved, and the work can be easily automated.

In particular, in this example, since the width dimension of the guide convex portion 78 increases from the base end portion toward the tip end portion, the position of the pad 20 in the third direction can be regulated as the pad 20 is moved in the direction approaching the holder 19. That is, when the pad 20 is placed on the upper surface of the guide jig 79, it is not necessary to excessively increase the positional accuracy. From this aspect as well, the workability of the work of assembling the pad 20 to the holder 19 can be improved, and the work of assembling the pad 20 to the holder 19 can be easily automated.

Figure 19A:
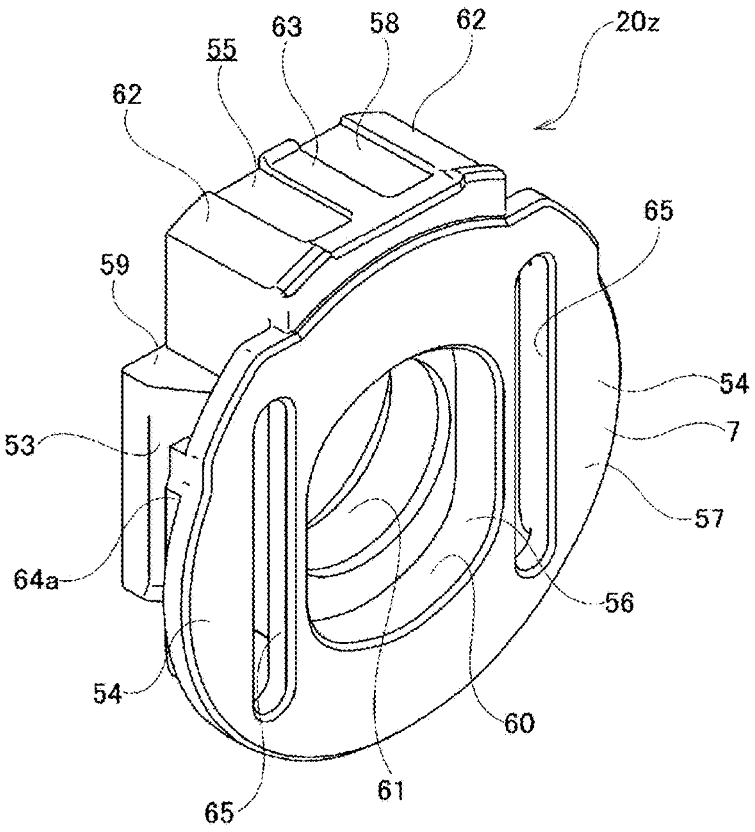
FIGS. 19A and 19B are views similar to FIGS. 14A and 14B showing a pad according to a comparative example of the first example.
Figure 19B:
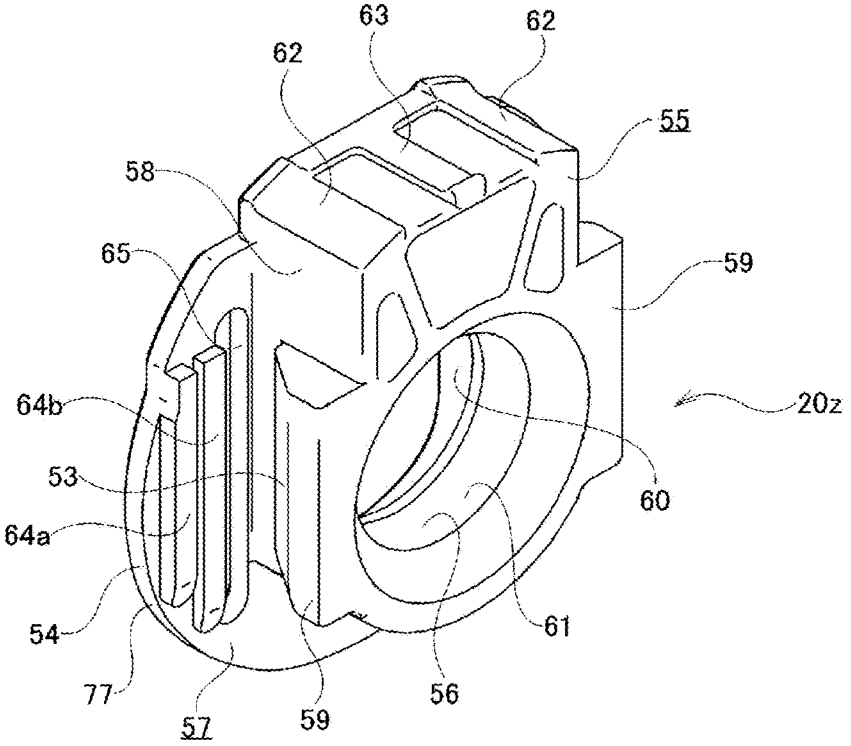
Figure 20:
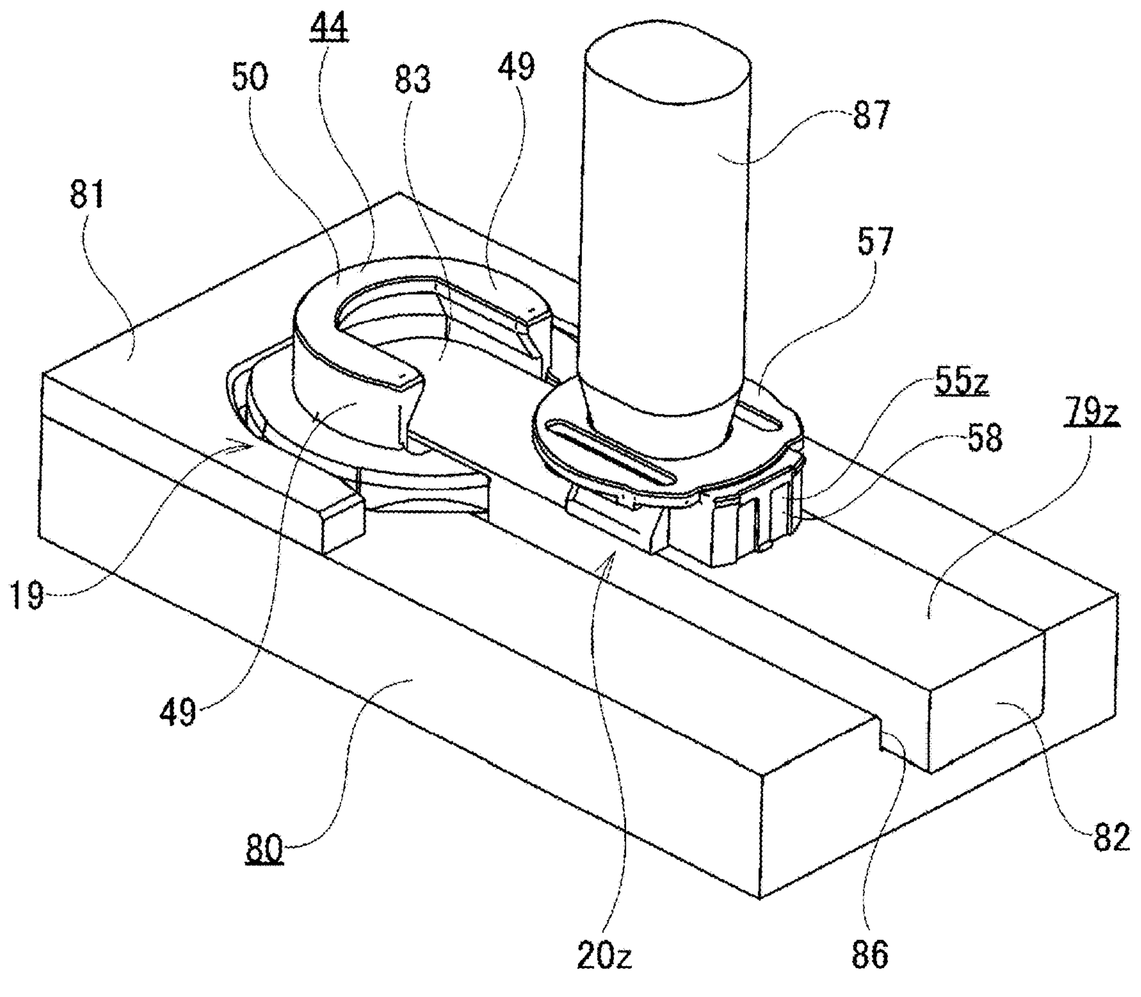
FIG. 20 is a view similar to FIG. 18B according to the comparative example of the first example.
Figures 21A, 21B, 21C, 21D:
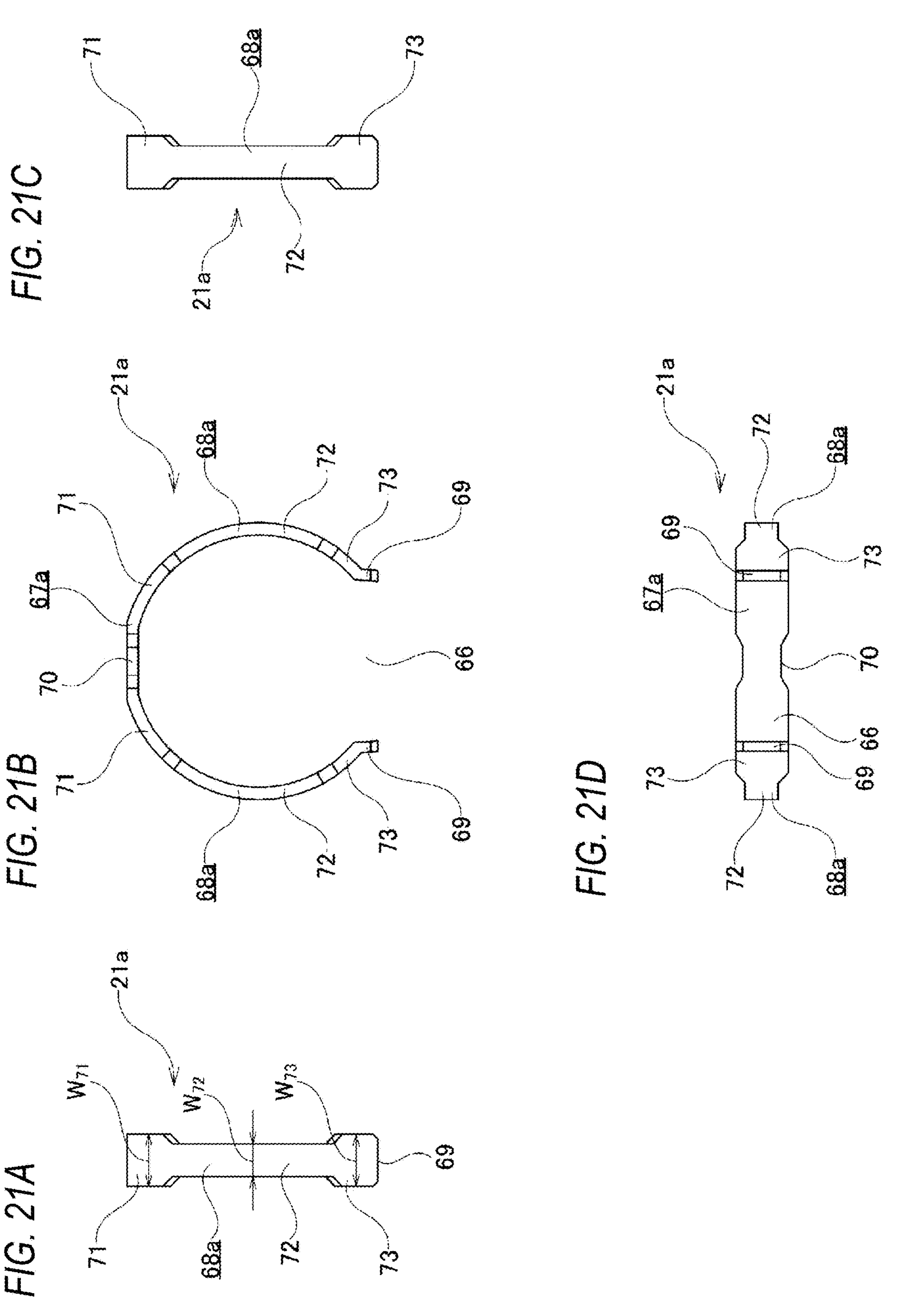
FIGS. 21A to 21D are views showing an elastic member taken out according to a second example of the embodiment of the present disclosure, where

On the other hand, as in a comparative example shown in FIGS. 19A to 20, in a case where a pad 20*z* does not have a pad recessed portion on a side surface of a pad base portion 55*z* on the other side in a second direction, and the guide jig 79*z* also does not have a guide convex portion, when the pad 20*z* is assembled to the holder 19, the pad 20*z* may be displaced in a third direction, and an end surface of the pad base portion 55*z* in a first direction and an end portion of any of the guide portions 49 on a side far from the worm 18 in the first direction may interfere with each other. Therefore, the workability of the work of assembling the pad 20*z* to the holder 19 is reduced, and it is difficult to automate the work.

In this example, in the free state before the two pad elastic pressing plates 54 are elastically deformed, the height of at least one ridge 64*a*, 64*b* in the second direction provided on each of the two pad elastic pressing plates 54 increases continuously or stepwise as a distance from the worm 18 in the third direction increases. Specifically, of the two ridges 64*a* and 64*b*, the height of the ridge 64*a* in the second direction on the side far from the worm 18 in the third direction is higher than the height of the ridge 64*b* in the second direction on the side close to the worm 18 in the third direction. Therefore, the displacement of the tip end portion of the worm 18 in the third direction when the rotation direction of the worm 18 changes can be stably prevented.

By assembling the pad 20 to the protruding portion 44 of the holder 19, when the tip end portions of the ridges 64*a* and 64*b* of the two pad elastic pressing plates 54 elastically abut on the two holder pressed surfaces 52 of the holder 19, each of the two pad elastic pressing plates 54 is elastically deformed so as to tile in a direction toward the one side in the second direction as a distance from the worm 18 in the third direction increases, centered on the base end portions thereof.

When the heights of the two ridges provided on each of the two pad elastic pressing plates in the second direction are the same as each other, in a state in which the pad is assembled to the protruding portion of the holder, there is a possibility that only the tip end portion of the ridge on the side close to the worm in the third direction abuts on the holder pressed surface, and the tip end portion of the ridge on the side far from the worm in the third direction does not abut on the holder pressed surface. Therefore, there is a possibility that a manner of the elastic deformation of the pad elastic pressing plate cannot be stabilized, or a surface pressure of an abutting portion between the tip end portion of the ridge on the side close to the worm in the third direction and the holder pressed surface becomes excessive, and wear occurs in the abutting portion. As a result, there is a possibility that the elastic forces Fx and Fp cannot be stabilized based on the fact that the tip end portion of the ridge elastically presses the holder pressed surface toward the other side in the second direction.

On the other hand, in this example, the height of the ridge 64*a* in the second direction on the side far from the worm 18 in the third direction is higher than the height of the ridge 64*b* in the second direction on the side close to the worm 18 in the third direction. Therefore, in a state in which the pad 20 is assembled to the protruding portion 44 of the holder 19, the tip end portions of the two ridges 64*a* and 64*b* can reliably abut on the holder pressed surface 52. Therefore, the manner of the elastic deformation of the pad elastic pressing plate 54 can be stabilized, the surface pressure of the abutting portions between the tip end portions of the ridges 64*a* and 64*b* and the holder pressed surface 52 can be prevented from becoming excessive, and the occurrence of wear at the abutting portions can be prevented. As a result, the elastic forces Fx and Fp can be stabilized based on the fact that the tip end portions of the ridges 64*a* and 64*b* elastically press the holder pressed surface 52 toward the other side in the second direction, and the displacement of the tip end portion of the worm 18 in the third direction when the rotation direction of the worm 18 changes can be stably prevented.

Further, according to the worm reducer 14 of this example, it is possible to hold the grease for lubricating the abutting portions between the tip end portions of the ridges 64*a* and 64*b* and the holder pressed surface 52 between the two ridges 64*a* and 64*b* provided on each of the two pad elastic pressing plates 54. Therefore, the lubrication state of the abutting portions between the tip end portions of the ridges 64*a* and 64*b* and the holder pressed surface 52 can be favorably maintained for a long period of time. From this aspect as well, it is possible to prevent the occurrence of wear at the abutting portions between the tip end portions of the ridges 64*a* and 64*b* and the holder pressed surface 52.

In this example, the number of ridges 64*a* and 64*b* provided on each of the two pad elastic pressing plates 54 is two, but when the worm reducer of the aspect of the present disclosure is implemented, the number of ridges provided on each of the two pad elastic pressing plates may be three or more, or may be one. When the number of ridges provided on each of the two pad elastic pressing plates is one, the tip end portion of the ridge is implemented by an inclined surface inclined in a direction toward the other side in the second direction as the distance from the worm in the third direction increases. Accordingly, a contact area between the tip end portion of the ridge and the holder pressed surface can be increased, thereby preventing the elastic deformation of the pad elastic pressing plate from becoming unstable and preventing the tip end portion of the ridge from being worn.

Second Example

A second example of the embodiment of the present disclosure will be described with reference to FIGS. 21A to 22C. A worm reducer of this example is different from the worm reducer 14 of the first example in the configuration of an elastic member 21*a*. Since the configuration and operation effects of other portions are similar to those of the worm reducer 14 of the first example, the description thereof will be omitted.

As shown in FIGS. 21A to 21D, the elastic member 21*a* is implemented by a cut-out cylindrical (substantially C-shaped) plate spring having the discontinuous portion 66 at one position in a circumferential direction. In this example, the elastic member 21*a* includes a base portion 67*a* located on a side far from the worm 18 in the first direction, and two arm portions 68*a* extending in the circumferential direction from end portions on both sides of the base portion 67*a* in the circumferential direction.

In this example, the base portion 67*a* is implemented by a flat plate orthogonal to the first direction. The base portion 67*a* has a constricted portion 70 in an intermediate portion in the third direction, a width dimension of which in the second direction is smaller than a width dimension of both side portions in the third direction. However, the constricted portion 70 may be omitted.

Each of the two arm portions 68*a* is formed in a partially cylindrical shape. In this example, each of the two arm portions 68*a* includes a base-side wide portion 71, a narrow portion 72, and a tip-side wide portion 73 in order from a side close to the base portion 67*a* in the circumferential direction. In this example, a width dimension W71 of the base-side wide portion 71 in the second direction and a width dimension W73 of the tip-side wide portion 73 in the second direction are the same, and a width dimension W72 of the narrow portion 72 in the second direction is smaller than the width dimension W71 of the base-side wide portion 71 in the second direction and the width dimension W73 of the tip-side wide portion 73 in the second direction (W72<W71=W73).

In this example, each of the two arm portions 68*a* has the bent portion 69 bent radially outward from the tip end portion of the tip-side wide portion 73. A width dimension of the bent portion 69 in the second direction is the same as the width dimension W73 of the tip-side wide portion 73 in the second direction. However, the bent portion 69 may be omitted.

The elasticity of the elastic member 21*a* can be adjusted by adjusting the width dimension W72 of each narrow portion 72 of the two arm portions 68*a* in the second direction. That is, in the worm reducer of this example, by adjusting the width dimension W72 of the narrow portion 72 in the second direction, it is possible to appropriately adjust the force with which the elastic member 21*a* elastically biases a tip end portion of the worm 18 toward the worm wheel 17 side via the pad 20. As a result, it is possible to suppress the occurrence of backlash at a meshing portion between the wheel teeth 24 and the worm teeth 25, suppress the occurrence of abnormal noise, and suppress an unnecessary increase in friction at the meshing portion.

Further, according to this example, the handleability of the elastic member 21*a* can be improved. The reason will be described with reference to FIGS. 23A to 24C in addition to FIGS. 21A to 22C.

FIGS. 23A to 24C show a comparative example of to the second example. In the comparative example, each of two arm portions 68*z* constituting an elastic member 21*z* includes only the base-side wide portion 71 and a narrow portion 72*z* in order from the side close to the base portion 67*a* in the circumferential direction, and does not include the tip-side wide portion 73. The elasticity of the elastic member 21*z* of the comparative example can also be adjusted by adjusting a width dimension of the narrow portion 72*z* in the second direction.

Figure 24A:
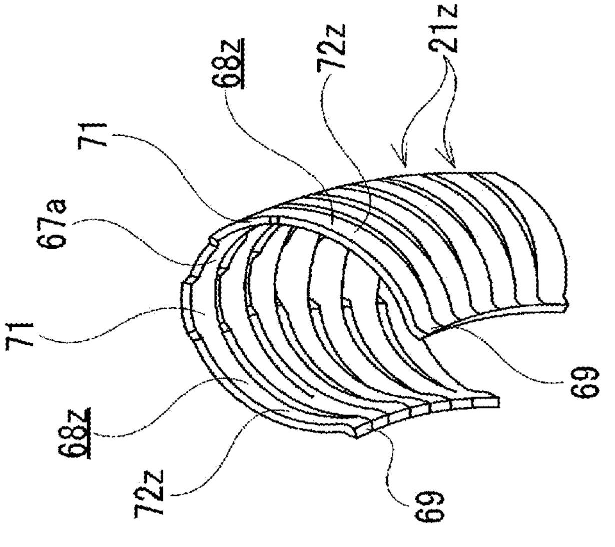
FIGS. 24A to 24C are views similar to FIGS. 22A to 22C according to the comparative example of the second example.
Figure 24B:
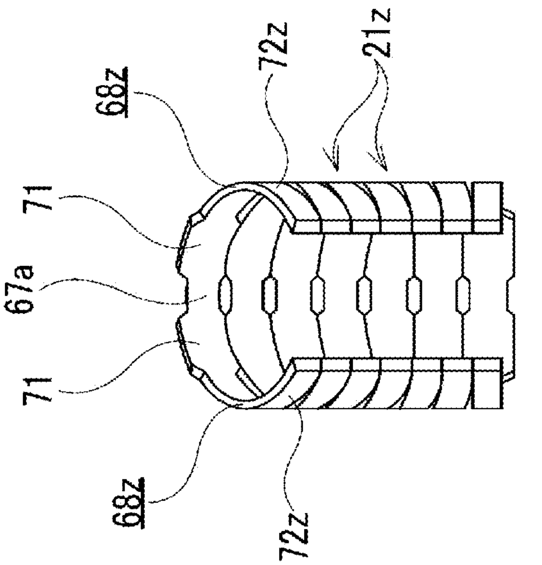
Figure 24C:
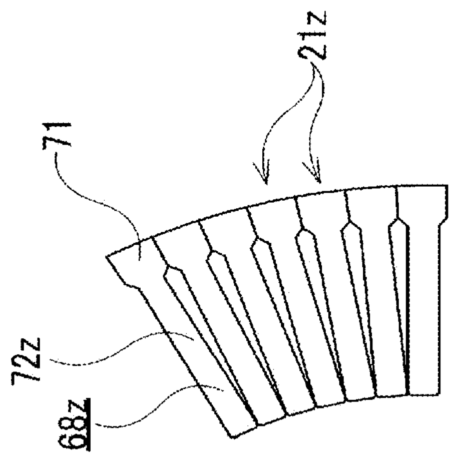
Figure 25:
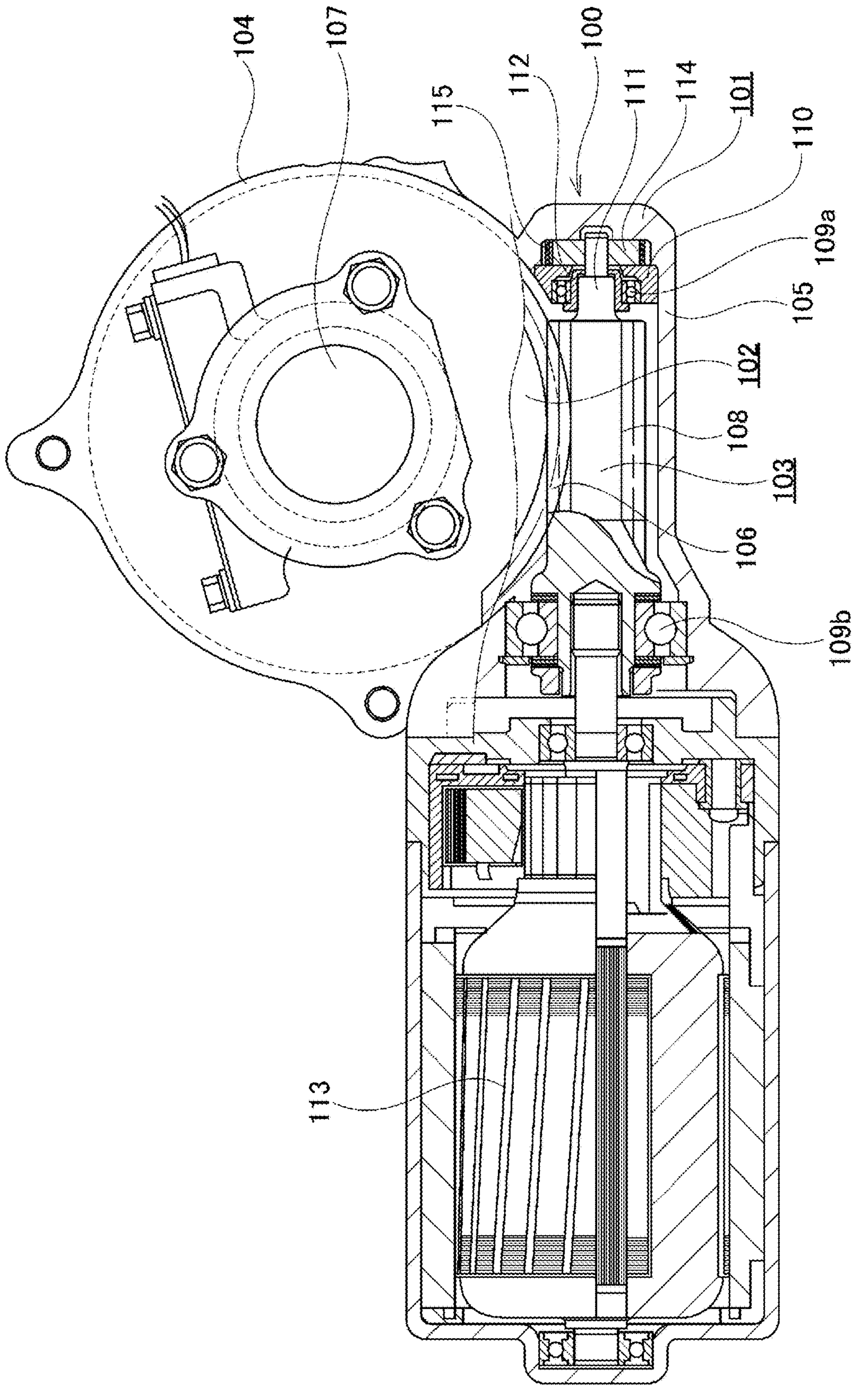
FIG. 25 is a cross-sectional view showing an example of a structure of a worm reducer in the related art.

In the elastic member 21*z* of the comparative example, the width dimension of the narrow portion 72*z* in the second direction is smaller than the width dimension of the base-side wide portion 71 in the second direction. Therefore, when the plurality of elastic members 21*z* are stacked in the axial direction, as shown in FIGS. 24A to 24C, the elastic members 21*z* are inclined toward a discontinuous portion 66 side, which makes handleability troublesome.

Figure 22C:
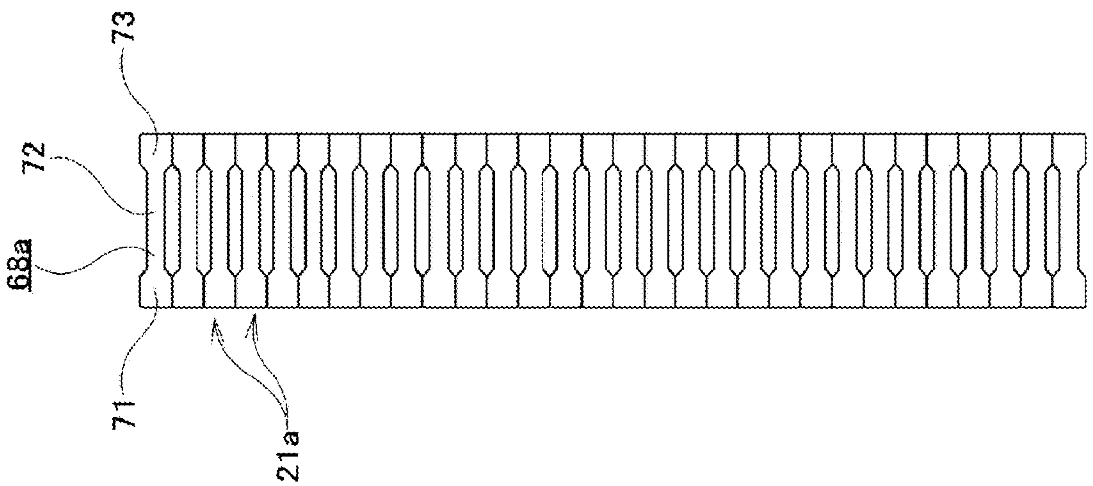
FIGS. 22A to 22C are views showing a state in which the elastic members are stacked, where
Figure 22B:
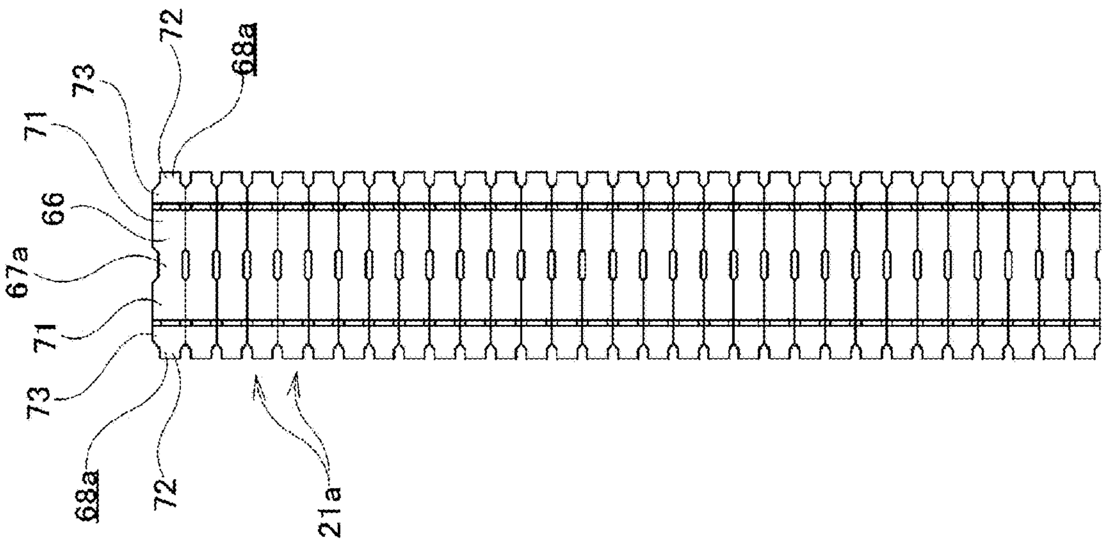
Figure 22A:
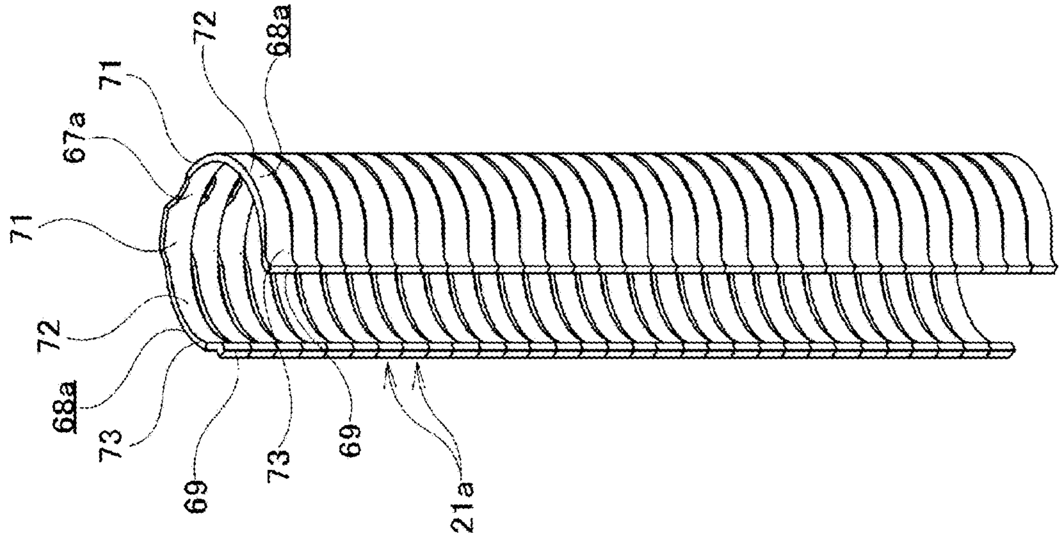
Figure 23A:
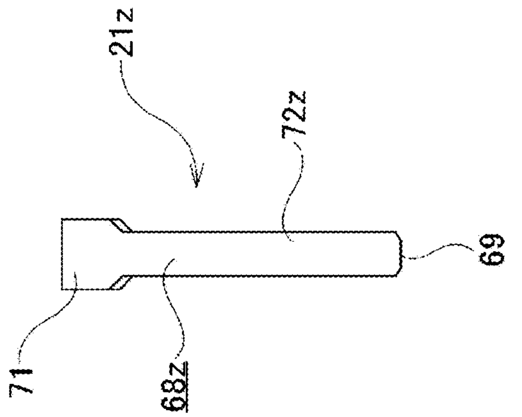
FIGS. 23A to 23D are views similar to FIGS. 21A to 21D according to a comparative example of the second example.
Figure 23B:
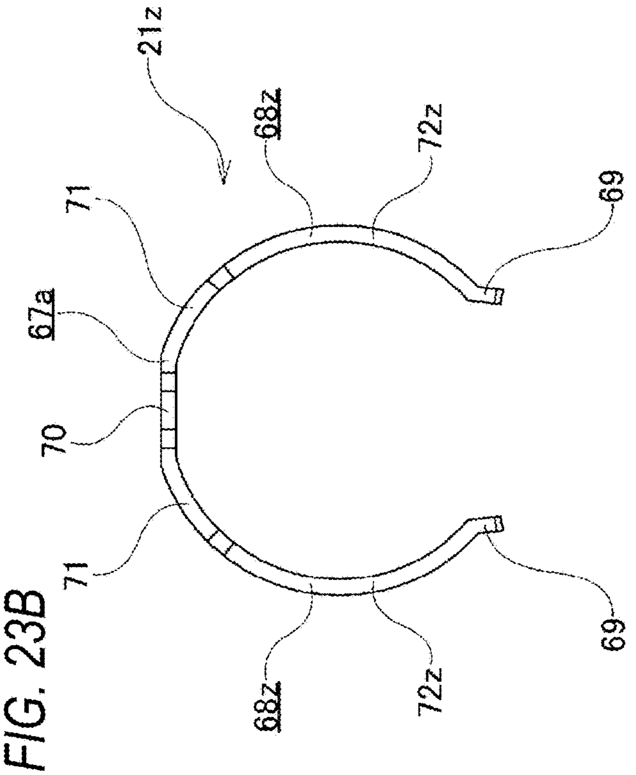
Figure 23C:
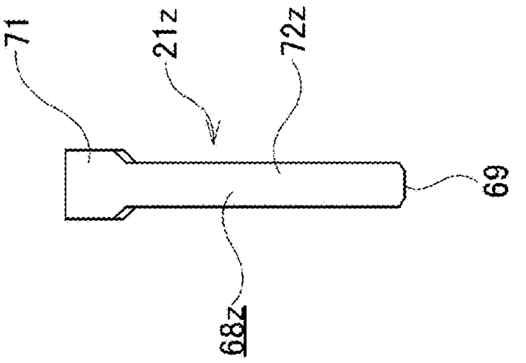
Figure 23D:
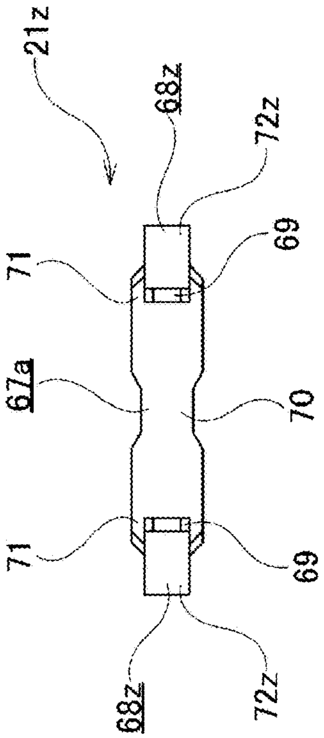

On the other hand, in this example, each of the two arm portions 68*a* constituting the elastic member 21*a* has the base-side wide portion 71 and the tip-side wide portion 73 having the same width dimensions W71 and W73 in the second direction at portions adjacent to both sides of the narrow portion 72 in the circumferential direction. Therefore, as shown in FIGS. 22A to 22C, even when the plurality of elastic members 21*a* are overlapped in the axial direction, it is possible to prevent the elastic members 21*a* from being inclined, and thus it is possible to satisfactorily ensure handleability of the elastic members 21*a*. Therefore, for example, it is easy to perform so-called bar wrapping in which the periphery is wrapped in a state in which the plurality of elastic members 21*a* are overlapped in the axial direction. And/or, it is easy to set the elastic members 21*a* in a fixed arrangement device in a state of being overlapped in the axial direction.

In the elastic member 21*a* of this example, the base portion 67*a* is implemented by a flat plate, and the base portion 67*a* has the constricted portion 70 in the intermediate portion in the third direction. Therefore, it is easy to perform phase alignment of the elastic member 21*a* with respect to the protruding portion 44 of the holder 19 in the circumferential direction. However, the phase alignment of the elastic member with respect to the holder can be performed by any method such as displaying a mark. In this case, the base portion can be formed in a partially cylindrical shape and/or the constricted portion can be omitted.

Although various embodiments have been described above, it goes without saying that the present disclosure is not limited to such examples. It is apparent for those skilled in the art to which the present disclosure belongs that various modified examples or corrected examples are conceivable within the scope recited in the claims, and it is understood that the above falls within the technical scope of the present disclosure. In addition, within the scope not departing from the gist of the invention, each of the configuration elements in the above embodiments may be combined in any manner.

REFERENCE SIGNS LIST

1: electric power steering device
2: steering wheel
3: steering shaft
4: steering column

5a, 5b: universal joint
6: intermediate shaft
7: steering gear unit
8: electric assist device
9: pinion shaft
10: rack shaft
11: housing
12: rack accommodating portion
13: pinion accommodating portion
14: worm reducer
15: electric motor
16: housing
17: worm wheel
18: worm
19: holder
20, 20z: pad
21, 21a, 21z: elastic member
22: wheel accommodating portion
23: worm accommodating portion
24: wheel tooth
25: worm tooth
26: female spline portion
27: output shaft
28: male spline portion
29: ball bearing
30: small-diameter cylindrical surface portion
31: large-diameter cylindrical surface portion
32: support bearing
33: inner ring
34: outer ring
35: ball
36: bush
37: retainer
38: fitting cylindrical portion
39: inward flange portion
40: wave washer
41: holder inclined surface (holder engagement portion)
42: annular portion
43: side plate portion
44: protruding portion
45: flat portion
46: inner circumferential surface
47: recessed portion
48: stepped portion
49: guide portion
50: connection portion
51: inner side surface
52: holder pressed surface
53: pad inclined surface (pad engagement portion)
54: pad elastic pressing plate
55: pad base portion
56: through hole
57: flat plate portion
58: base portion body
59: base portion overhang portion
60: oval hole portion
61: circular hole portion
62: pressed portion
63: pedestal surface portion
64a, 64b: ridge
65: slit
66: discontinuous portion
67, 67a: base portion
68, 68a, 68z: arm portion
69: bent portion
70: constricted portion
71: base-side wide portion
72, 72z: narrow portion
73: tip-side wide portion
74: held portion
75: holder-side positioning engagement portion
76: pad recessed portion
77: pad elastic pressing portion
78: guide convex portion
79: guide jig
80: holding jig
81: restraint jig
82: base portion
83: tongue-shaped portion
84: abutting surface
85: jig-side positioning engagement portion
86: recessed portion
87: insertion jig
100: worm reducer
101: housing
102: worm wheel
103: worm
104: wheel accommodating portion
105: worm accommodating portion
106: wheel tooth
107: rotation shaft
108: worm tooth
109a, 109b: ball bearing
110: holder
111: large-diameter portion
112: bush
113: electric motor
114: pad
115: torsion coil spring

The invention claimed is:

1. A worm reducer comprising:

a housing including a wheel accommodating portion and a worm accommodating portion that is disposed at a skew position with respect to the wheel accommodating portion and whose axially intermediate portion opens to the wheel accommodating portion;

a worm wheel having wheel teeth on an outer circumferential surface thereof and configured to be rotatably supported inside the wheel accommodating portion;

a worm having worm teeth that meshes with the wheel teeth on an outer circumferential surface thereof and configured to be rotatably supported inside the worm accommodating portion;

a holder disposed between a tip end portion of the worm and the worm accommodating portion;

a pad externally fitted to the tip end portion of the worm; and an elastic member configured to be assembled to the holder and configured to elastically bias the tip end portion of the worm toward a worm wheel side via the pad, wherein the holder includes a held portion that is internally fitted and held inside the worm accommodating portion in a state in which rotation is prevented, two guide portions that protrude toward one side in a second direction, which is an axial direction of the worm accommodating portion, from two positions spaced apart in a third direction orthogonal to both a first direction, which is a biasing direction by the elastic member, and the second direction, of a side surface on one side of the held portion in the second direction, and two holder engagement portions provided on inner side surfaces of the two guide portions facing each other, and the pad includes a pad base portion that is disposed between the two guide portions, two pad engagement portions that are provided on side surfaces on both sides of the pad base portion in the third direction and are in contact with the two holder engagement portions, a pad recessed portion formed on a side surface on the other side of the pad base portion in the second direction to extend in the first direction, and a pad elastic pressing portion that elastically presses a part of the holder toward the other side in the second direction to apply a preload to a contact portion between the holder engagement portion and the pad engagement portion.

2. The worm reducer according to claim 1, wherein the two holder engagement portions are implemented by two holder inclined surfaces inclined in directions approaching each other as the two holder engagement portions approach one side in the second direction, and the two pad engagement portions are implemented by two pad inclined surfaces in surface contact with the two holder inclined surfaces.

3. The worm reducer according to claim 1, wherein the holder includes a connection portion that connects an end portion of the two guide portions on a side close to the worm wheel in the first direction.

4. The worm reducer according to claim 1, wherein the pad elastic pressing portion includes two pad elastic pressing plates located on one side in the second direction with respect to the two pad engagement portions and each extending from a central portion of the pad in the third direction toward a side away from each other in the third direction, and a part of the holder that is elastically pressed toward the other side in the second direction by the two pad elastic pressing plates is implemented by a holder pressed surface provided on an end surface on one side in the second direction of each of the two guide portions.

5. The worm reducer according to claim 4, wherein each of the two pad elastic pressing plates has a slit penetrating in the second direction and extending in the first direction at an end portion on a central side of the pad in the third direction.

6. The worm reducer according to claim 1, wherein the elastic member is implemented by a plate spring.

7. A method for assembling the worm reducer according to claim 1, the method comprising steps of:

disposing the holder with respect to a guide jig having a guide convex portion extending in a predetermined direction such that the first direction coincides with an extending direction of the guide convex portion and a center position between the two guide portions in the third direction coincides with a center position of the guide convex portion in a width direction; and disposing the pad base portion between the two guide portions by moving the pad along the guide convex portion in a state in which the guide convex portion is inserted inside the pad recessed portion.

8. The method for assembling the worm reducer according to claim 7, wherein the guide jig is configured such that a width dimension of the guide convex portion increases toward a front side in a moving direction of the pad.

9. The method for assembling the worm reducer according to claim 7, wherein in the step, the guide jig and the holder are positioned in the third direction by engaging a jig-side positioning engagement portion provided in the guide jig with a holder-side positioning engagement portion provided in the holder.

* * * * *